US008209536B2

(12) United States Patent
Yao

(10) Patent No.: US 8,209,536 B2
(45) Date of Patent: Jun. 26, 2012

(54) MESSAGE AUTHENTICATION SYSTEM, MESSAGE TRANSMISSION APPARATUS AND MESSAGE RECEPTION APPARATUS

(75) Inventor: Taketsugu Yao, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1171 days.

(21) Appl. No.: 11/446,969

(22) Filed: Jun. 6, 2006

(65) Prior Publication Data

US 2006/0282675 A1 Dec. 14, 2006

(30) Foreign Application Priority Data

Jun. 10, 2005 (JP) ................................. 2005-171200

(51) Int. Cl.
*G06F 21/00* (2006.01)
(52) U.S. Cl. ............ 713/170; 713/168; 713/176; 726/3; 380/259; 705/75; 709/232; 455/410
(58) Field of Classification Search .................. 713/176, 713/168, 170
See application file for complete search history.

(56) References Cited

U.S. PATENT DOCUMENTS

| 4,656,474 | A * | 4/1987 | Mollier et al. ................ 713/181 |
| 6,032,258 | A * | 2/2000 | Godoroja et al. ................... 726/3 |
| 6,529,886 | B1 * | 3/2003 | Campana et al. ............... 705/78 |
| 6,578,144 | B1 * | 6/2003 | Gennaro et al. ............. 713/176 |
| 7,031,473 | B2 | 4/2006 | Morais et al. |
| 7,379,921 | B1 * | 5/2008 | Kiliccote ........................ 705/75 |
| 7,493,080 | B2 * | 2/2009 | Scaglione et al. ................ 455/9 |
| 7,571,319 | B2 * | 8/2009 | Gillum et al. ................ 713/168 |
| 7,602,915 | B2 * | 10/2009 | Iwamura ....................... 380/259 |
| 7,603,557 | B2 * | 10/2009 | Zhang et al. .................. 713/170 |
| 2003/0093669 | A1 | 5/2003 | Morais et al. |
| 2004/0006705 | A1 * | 1/2004 | Walker .......................... 713/200 |
| 2004/0073801 | A1 * | 4/2004 | Kalogridis et al. ........... 713/176 |
| 2004/0162983 | A1 | 8/2004 | Gotoh et al. |
| 2005/0021969 | A1 * | 1/2005 | Williams et al. .............. 713/176 |
| 2005/0033641 | A1 * | 2/2005 | Jha et al. ........................ 705/14 |
| 2005/0138352 | A1 * | 6/2005 | Gauvreau et al. ............. 713/153 |
| 2005/0182932 | A1 * | 8/2005 | Wheeler ........................ 713/168 |
| 2006/0149965 | A1 * | 7/2006 | Sharma ........................ 713/163 |

FOREIGN PATENT DOCUMENTS

JP          10-069222          3/1998
(Continued)

OTHER PUBLICATIONS

Perrig et al, SPINS: Security Protocols for Sensor Networks, Wireless Networks 8, 521-534, 2002, Kluwer Academic Publishers. Manufactured in The Netherlands.*

(Continued)

*Primary Examiner* — Taghi Arani
*Assistant Examiner* — Morshed Mehedi
(74) *Attorney, Agent, or Firm* — Rabin & Berdo, P.C.

(57) ABSTRACT

In a message authentication system in which a message is transmitted from a message transmission apparatus 100 to individual message reception apparatuses 120 through wireless communication connecting the message transmission apparatus 100 with the message reception apparatuses 120 via intermediary message reception apparatuses and the message is authenticated at each message reception apparatus, the message transmission apparatus first transmits an electronic signature to each message reception apparatus as a message transmission notification and then transmits the message and an authentication key to the message reception apparatus after allowing a predetermined time lag. Thus, the message reception apparatus does not need to hold the message before the authentication key is published (FIG. 7).

12 Claims, 15 Drawing Sheets

FOREIGN PATENT DOCUMENTS

| | | |
|---|---|---|
| JP | 2003-224560 | 8/2003 |
| JP | 2004-248270 | 9/2004 |

OTHER PUBLICATIONS

Ghazizadeh et al., "Security-aware adaptive dynamic source routing protocol", Local Computer Networks, 2002. Proceedings. LCN 2002. 27th Annual IEEE Conference on, Issue Date: Nov. 6-8, 2002, on pp. 751-760.*

Perrig et al., "Secure Broadcast Communication in Wired and Wireless Networks," Kluwer Academic Publishers, pp. 161-165 (2003).

* cited by examiner

MESSAGE AUTHENTICATION SYSTEM, MESSAGE TRANSMISSION APPARATUS AND MESSAGE RECEPTION APPARATUS

CROSS REFERENCE TO RELATED APPLICATION

The disclosure of Japanese Patent Application No. JP 2005-171200 filed Jun. 10, 2005, entitled "Message Authentication System, Message Transmission Apparatus and Message Reception Apparatus". The contents of that application are incorporated herein by reference in their entirety.

BACKGROUND OF THE INVENTION

The present invention relates to a message authentication system, a message transmission apparatus and a message reception apparatus to be adopted in a sensor network system comprising a message transmission apparatus such as a server that manages and controls the system and low-cost message reception apparatuses such as sensor nodes, in which the message transmission apparatus broadcasts a message to a message reception apparatus and the message reception apparatus, in turn, authenticates the message.

DESCRIPTION OF THE RELATED ART

In a sensor network system typically comprising a server and a plurality of nodes disposed around the server, the server often controls the individual nodes, e.g., sensor nodes with measurement functions, through multi-hop communication through which the server and the nodes engage in communication via intermediary nodes present between them.

It is not always feasible to equip the individual nodes in such a sensor network system with CPUs having high processing performance since the cost of the nodes needs to be kept to a minimum. The encryption technology that uses public keys and places significant processing onus on the recipient cannot be adopted in conjunction with the sensor network system comprising low-cost nodes and instead, a common key encryption technology that requires less processing power is adopted. For instance, a common key shared among all the devices is held at the server and the nodes, and a message from the server is authenticated by using the common key.

However, a node in the system may not have an anti-tampering function and, in such a case, the common key held at the node may be leaked to another electronic apparatus outside the system. This means that a message authenticated at the individual nodes may be an illegal message originating from an illegal user. In addition, a message relayed via nodes in multi-hop communication may be tampered with at an illegal router node.

These problems are addressed in, for instance, "Security in Broadcast Communication in Wired/Wireless Networks", co-written by Adrian Perrig and J. D. Tyger (Kluwer Academic Publishers). The publication discloses that when a broadcast message from the server is authenticated at each node, the time axis is adjusted between the server and the node so as to allow a predetermined length of a time lag before the transmission of the authentication key, thereby preventing an illegal user from posing as the server (see pp 161-165).

However, this technology requires all the messages having been transmitted to be held until the authentication key reaches (broadcast to) the node, and the cost of storing the messages at the node is significant.

SUMMARY OF THE INVENTION

An object of the present invention is to provide an alternative to holding messages at a message reception apparatus corresponding to the node prior to the arrival of the authentication key, so as to minimize the message memory occupancy rate.

The object described above is achieved in an aspect of the present invention by providing a message authentication system comprising a message transmission apparatus and a plurality of message reception apparatuses in which a message is transmitted from the message transmission apparatus to each message reception apparatus through wireless communication connecting the message transmission apparatus and the message reception apparatus via an intermediary message reception apparatus present between them and the message is authenticated at the message reception apparatus. The message transmission apparatus in the message authentication system comprises a signature generation unit that generates an electronic signature for a given message by using an authentication key; a message holding unit that holds the message in correlation to the authentication key and the electronic signature and a message transmission unit that transmits the electronic signature to the message reception apparatus and transmits the message and the authentication key correlated with the message after allowing a predetermined time lag. The message reception apparatus comprises a message reception unit that receives the electronic signature transmitted from the message transmission apparatus and the message and the authentication key transmitted after the predetermined time lag; a signature holding unit that holds the electronic signature; and a message authentication unit that authenticates the message through comparison of an electronic signature generated by using the authentication key with the electronic signature held at the signature holding unit.

The wireless communication may include single-hop communication through which the terminals at the message transmission apparatus and the message reception apparatus or the like engage in direct communication with each other and multi-hop communication through which they engage in communication via another terminal to enable a wider range of terminal communication.

It is assumed that the electronic signature generated by using an authentication key is an MAC (message authentication code) generated in correspondence to the message. An MAC may be constituted with a bit string generated by applying a hash function on input data constituted with the authentication key and the message having undergone a specific type of processing, such as an HMAC (keyed-hashing for message authentication code), or a bit string generated by dividing the message into a plurality of blocks and repeatedly encrypting and superimposing the individual blocks, such as a CBC-MAC (cipher block chaining-message authentication code). The data size of such a bit string is normally smaller than the data size of the message itself.

In the structure described above, the message is not held at the message reception apparatus before the authentication key becomes available and thus, the message memory occupancy rate can be minimized. The present invention addresses the problems often occurring in the method in the related art in which a message is transmitted to a message reception apparatus and a public authentication key is transmitted after a predetermined time lag such as that a new message cannot be accepted with the memory at the message reception apparatus having become full with a plurality of messages and that the cost of the message reception apparatus increases as it needs to be equipped with a large-capacity memory.

The object of the present invention is also achieved in another aspect of the present invention by providing a message transmission apparatus that transmits messages to a plurality of message reception apparatuses through multi-hop communication, comprising a signature generation unit that generates an electronic signature for a given message by using an authentication key; a message holding unit that holds the message in correlation to the authentication key and the electronic signature; and a message transmission unit that transmits the electronic signature to a message reception apparatus and transmits the message and the authentication key correlated with the message after allowing a predetermined time lag.

The message transmission apparatus structured as described above first transmits the electronic signature as a notification of a message transmission and then transmits the message itself and the authentication key to be used to verify the electronic signature after the predetermined delay. In other words, since the message is not held at the message reception apparatus before the authentication key is made available to the message reception apparatus, the message memory occupancy rate can be minimized.

In the message transmission apparatus described above, either of the following two methods may be adopted in order to prevent an illegal user from posing as the message transmission apparatus in relation to the message reception apparatuses:

(1) An event count synchronization method in which the reception status at each message reception apparatus is verified and an authentication key is transmitted and updated based upon the number of receptions at the message reception apparatus; or (2) A time-point synchronization method in which the message transmission apparatus is synchronized with each message reception apparatus on the time axis and the validity of a message is verified based upon the transmission/reception timing.

The message transmission apparatus adopting the event count synchronization method in (1) may further include an arrival verification unit that receives from the message reception apparatus reception verification information indicating that the electronic signature has been successfully received at the message reception apparatus, makes a decision as to whether or not the electronic signature correlated to the message has arrived at the message reception apparatus and allows the message transmission unit to transmit the message and the authentication key correlated to the message if the electronic signature is judged to have arrived at the message reception apparatus.

The message transmission apparatus adopting the structure described above is able to transmit the message and the authentication key only after verifying that the electronic signature has been received at the message reception apparatus as a notification of a message transmission. Since the authentication key remains unknown when the electronic signature is transmitted, an illegal message transmitted from an illegal source posing as the message transmission apparatus does not match up with the electronic signature having been transmitted ahead.

The message transmission apparatus may further include an authentication key generation unit that updates the authentication key at the signature generation unit by sequentially extracting a specific authentication key from an authentication key chain constituted with a plurality of authentication keys in correspondence to the number of electronic signatures having been generated at the signature generation unit.

In this case, the authentication key is updated in correspondence to each message to be transmitted or in correspondence to each set of a predetermined number of messages to be transmitted. Thus, even if a given key is leaked to a third party, an illegal act cannot be continuously committed. In addition, by handling the timing with which the authentication key is updated, e.g., the number of the electronic signatures generated before the authentication key is updated, as common information shared with each message reception apparatus, any message held back at an illegal intermediary message reception apparatus can be detected.

The authentication keys constituting the authentication key chain may be sequentially generated by applying a one-way function to a preset initial authentication key and, in such a case, the authentication key generation unit may extract the authentication key in the reverse order from the order in which the authentication keys have been generated.

While the authentication key chain may be obtained univocally along one direction, it cannot be obtained along the reverse direction. It may be generated by applying a one-way function, e.g., a hash function such as the MD5(message digest 5) or the SHA-1 (secure hash algorithm 1) and then be published after the code is rearranged along the reverse direction. In other words, the unknown authentication key to be used in conjunction with the current message cannot be deduced based upon a public authentication key, only the message transmission apparatus is able to generate valid electronic signatures and a valid electronic signature for a message cannot be generated even at the message reception apparatuses until the current authentication key is obtained. In addition, when a message needs to be authenticated at a message reception apparatus, the current authentication key is also a public key, making it possible to deduce the previous authentication key by applying the one-way function to the current authentication key for authentication key match-up.

The signature generation unit may generate a predetermined number of electronic signatures for (each corresponding to one of) the predetermined number of messages by using a single authentication key, and in such a case, the message transmission unit may transmit the predetermined number of messages together with the common authentication key shared for the predetermined number of messages.

When the authentication key is updated in correspondence to each set of the predetermined number of messages, a single authentication key is used for the predetermined number of messages and thus, only one authentication key needs to be transmitted in correspondence to the predetermined number of messages.

The message transmission apparatus adopting the time-point synchronization method described in (2) above may further include a time-point synchronization control unit that first achieves time-point synchronization with each message reception apparatus, manages a message transmission time lag to elapse after transmitting the electronic signature and an authentication key transmission time lag to occur when the authentication key is updated and engages the message transmission unit to transmit the message and the authentication key correlated to the message based upon the transmission time lags.

The message transmission apparatus adopting the structure described above achieves time-point synchronization with each of the message reception apparatuses, and thus, it is possible to coordinate the time points at which messages and authentication keys are transmitted/received. In other words, a message having been tampered with by an illegal message reception apparatus or another electronic apparatus can be detected since the message timing will deviate from the time-point synchronization.

The message transmission apparatus may further include an authentication key generation unit that updates the authentication key at the signature generation unit by sequentially extracting each time after a predetermined length of time interval, a specific authentication key from an authentication key chain constituted with a plurality of authentication keys.

In this case, the authentication key is updated over the predetermined time intervals, and even if the authentication key is leaked at some point, an illegal act cannot be committed continuously. In addition, since the authentication key is updated in synchronization with each message reception apparatus, a message held back at an illegal intermediary message reception apparatus can be readily detected.

The authentication keys constituting the authentication key chain may be sequentially generated by applying a one-way function to a preset initial authentication key and, in such a case, the authentication key generation unit may extract the authentication key in the reverse order from the order in which the authentication keys have been generated.

The unknown authentication key to be used in conjunction with the current message cannot be deduced based upon a public authentication key, only the message transmission apparatus is able to generate valid electronic signatures and a valid electronic signature for a message cannot be generated even at the message reception apparatuses. In addition, when a message needs to be authenticated at the message reception apparatus, the current authentication key is also a public key, making it possible to deduce the previous authentication key by applying the one-way function to the current authentication key for authentication key match.

The signature generation unit may generate all the electronic signatures for messages generated during the predetermined length of time by using a single authentication key and, in such a case, the message transmission unit may transmit the messages generated during the predetermined length of time together with the common authentication key shared for the messages generated during the predetermined length of time.

When the authentication key is updated over the predetermined time intervals, a single authentication key is allocated to all the messages generated within each time block lasting over the predetermined length of time, and thus, only one authentication key needs to be transmitted for the messages generated over the predetermined length of time.

The present invention also provides a message transmission method through which messages are transmitted to a plurality of message reception apparatuses through multi-hop communication from the message transmission apparatus described above and a program that enables a computer to function as the message transmission apparatus.

The object described above is further achieved in yet another aspect of the present invention by providing a message reception apparatus that receives a message from a message transmission apparatus through multi-hop communication, comprising a message reception unit that receives an electronic signature transmitted from the message transmission apparatus and then receives a message and an authentication key transmitted after a predetermined time lag, a signature holding unit that holds the electronic signature; and a message authentication unit that authenticates the message by comparing an electronic signature generated by using the authentication key with the electronic signature held at the signature holding unit.

Either (1) event count synchronization method or (2) time-point synchronization method described earlier may be adopted in the message reception apparatus in order to prevent an illegal user to pose as the message transmission apparatus in relation to the message reception apparatus.

The message reception apparatus adopting the event count synchronization method in (1) above may further include a reception verification transmission unit that, upon receiving an electronic signature from the message transmission apparatus, transmits to the message transmission apparatus reception verification information indicating that the electronic signature has been successfully received.

By adopting the structure described above, the message reception apparatus is able to send a reply to the message transmission apparatus indicating that the electronic signature constituting a notification of a message transmission has been received. This reception verification information, in turn, makes the sender of the reception verification information eligible to receive the authentication key. Since the authentication key is still unknown when the electronic signature is transmitted, an illegal message transmitted by an illegal user posing as the message transmission apparatus does not match up with the electronic signature having been transmitted ahead.

The message reception apparatus may further include an authentication key certifying unit that certifies that the authentication key is updated in correspondence to each set of a predetermined number of electronic signatures or messages and does not recognize that the authentication key has been transmitted from the message transmission apparatus if the authentication key update does not match up. The authentication key certifying unit may hold the authentication key, and in the event of an authentication key update, it may apply one-way function to the updated authentication key a given number of times. Then, it may compare the arithmetic operation results with the value indicated by the pre-update authentication key having been held, and if they do not match, the authentication key certifying unit may withhold a certification that the authentication key has been transmitted from the message transmission apparatus.

The message reception apparatus adopting the time-point synchronization method in (2) above may further include a time-point synchronization certifying unit that, upon establishing the time-point synchronization with the message transmission apparatus, ascertains whether or not the message and the authentication key have been received a preset message transmission time lag to elapse following the electronic signature and with a preset authentication key transmission time lag to elapse in the event of an authentication key update and withholds an authentication of the message if the reception time points indicate a deviation beyond a predetermined range.

The message reception apparatus adopting the structure described above achieves time-point synchronization with the message transmission apparatus, and thus, the message/authentication key transmission/reception timing can be coordinated. In other words, a message having been tampered with by an illegal message reception apparatus or another electronic apparatus can be detected since the message timing will deviate from the time-point synchronization.

The message reception apparatus may further include an authentication key certifying unit that checks the authentication key to ensure that it has been updated after a predetermined time interval and withholds certification that the authentication key has been transmitted from the message transmission apparatus if the authentication key update does not match up with the predetermined time interval. The authentication key certifying unit may hold the authentication key, and in the event of an authentication key update, it may apply one-way function to the updated authentication key a given number of times. Then, it may compare the arithmetic operation results with the value indicated by the pre-update authentication key having been held, and if they do not match, the authentication key certifying unit may withhold a certification that the authentication key has been transmitted from the message transmission apparatus.

The present invention also provides a message reception method at which a message from a message transmission apparatus is received at the message reception apparatus through multi-hop communication and a program that enables a computer to function as the message reception apparatus.

In the message authentication system described above, a message and a corresponding authentication key may be transmitted simultaneously. In addition, they may be transmitted when the electronic signature for the next message is transmitted.

In addition, the message transmission apparatus may function as, for instance, a server capable of wirelessly transmitting at least messages to the message reception apparatuses. In addition, the message reception apparatuses may be a node capable of wirelessly receiving messages, which may be a sensor node having a measuring function. Accordingly, the message reception apparatuses may each be equipped with a low-end CPU. The message transmission apparatus and the message reception apparatuses may each be constituted with a personal computer, a PDA (personal digital assistant), a portable telephone, a portable audio player, a home game console, an information home appliance or the like.

While the message authentication system includes a plurality of apparatuses, no limitations need to be set forth with respect to the specific components and function modules to be included in a given apparatus, or a given component or function module may be provided as a stand-alone unit. Furthermore, a single apparatus may function as both the message transmission apparatus and a message reception apparatus.

As described above, according to the present invention, messages are not held at a message reception apparatus before the authentication key is published, making it possible to minimize the message memory occupancy rate. In addition, it provides an effective preventive means for inhibiting an intermediary message reception apparatus or another electronic apparatus from tampering with a message, interrupting a message or posing as the message transmission apparatus.

DETAILED DESCRIPTION OF THE PREFERRED EMBODIMENTS

Figure 1:
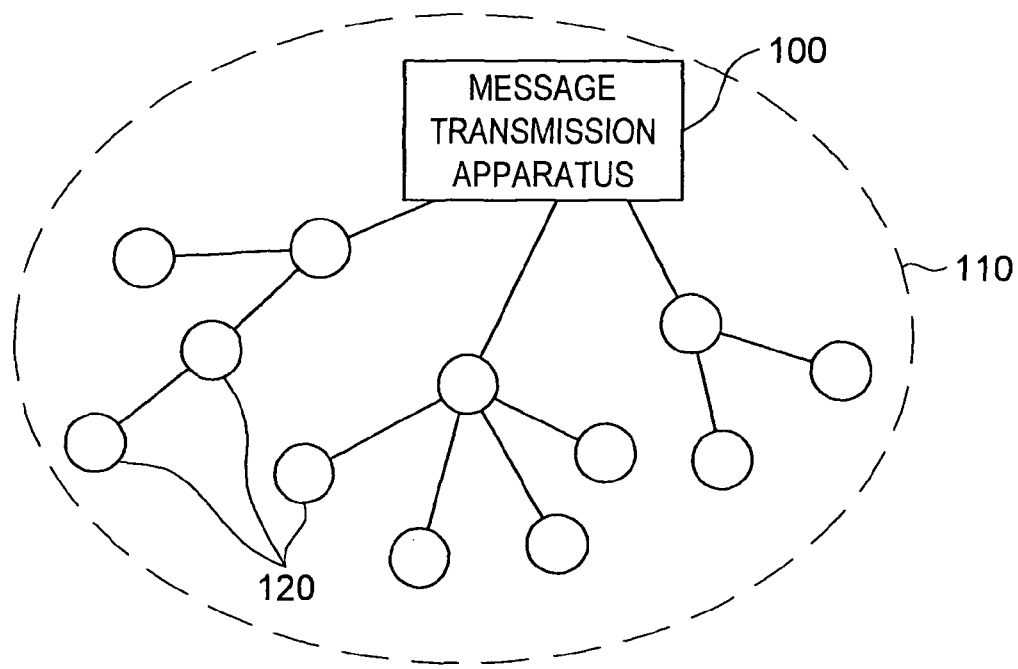
FIG. 1 schematically illustrates multi-hop communication.

The following is a detailed explanation of the preferred embodiments of the present invention, given in reference to the attached drawings. It is to be noted that in the specification and the drawings, the same reference numerals are assigned to components having substantially identical functions and structural features to preclude the necessity for a repeated explanation thereof.

FIG. 1 is a conceptual diagram illustrating multi-hop communication in conjunction with which an embodiment of the present invention may be achieved. The multi-hop communication is achieved in a system comprising a message transmission apparatus 100 and a plurality of message reception apparatuses 120 disposed around the message transmission apparatus 100. In multi-hop communication, a message broadcast by the message transmission apparatus 100 is transmitted to message reception apparatuses 120 at more remote locations via message reception apparatuses 120 located in between.

The message reception apparatuses 120 may each be constituted with a low-cost sensor node with a measuring function. A plurality of such sensor nodes are normally installed and they cannot be retrieved every time an update operation is executed. Accordingly, an environment that allows each message reception apparatus 120 to automatically update data transmitted by the message transmission apparatus 100 must be created. At the same time, highly effective security measures must be taken with regard to the update data, which play a crucial role in the message authentication system. The message reception apparatuses 120 in the embodiment are each achieved at low cost and are also capable of authenticating a message from the message transmission apparatus 100 with a high level of reliability and preventing another electronic apparatus from posing as the message transmission apparatus.

The message transmission apparatus 100 and the message reception apparatuses 120 may each comprise a personal computer, a PDA (personal digital assistant), a portable telephone, a portable audio player, a home game console or an information home appliance; and may each be achieved as an integrated unit equipped with both the message transmission function and the message reception function. Accordingly, an integrated unit capable of functioning both as a message transmission apparatus 100 and a message reception apparatus 120, functions as the message reception apparatus 120 when receiving a message transmitted from another message transmission apparatus 100 and functions as a message transmission apparatus 100 when transmitting a message to another message reception apparatus 120. In other words, the integrated unit is capable of relaying messages.

Either of the following two methods may be adopted in the system achieved in the embodiment in order to prevent an illegal user from posing as the message transmission apparatus in relation to the message reception apparatuses:

(1) An event count synchronization method in which the reception status at each message reception apparatus is verified and an authentication key is transmitted and updated based upon the number of receptions at the message reception apparatus; or (2) A time-point synchronization method in which the message transmission apparatus is synchronized with each message reception apparatus on the time axis and the validity of a message is verified based upon the transmission/reception timing.

These methods, adopted in separate embodiments are individually explained below.

(First Embodiment: Message Authentication System Adopting the Event Count Synchronization Method)

Figure 2:
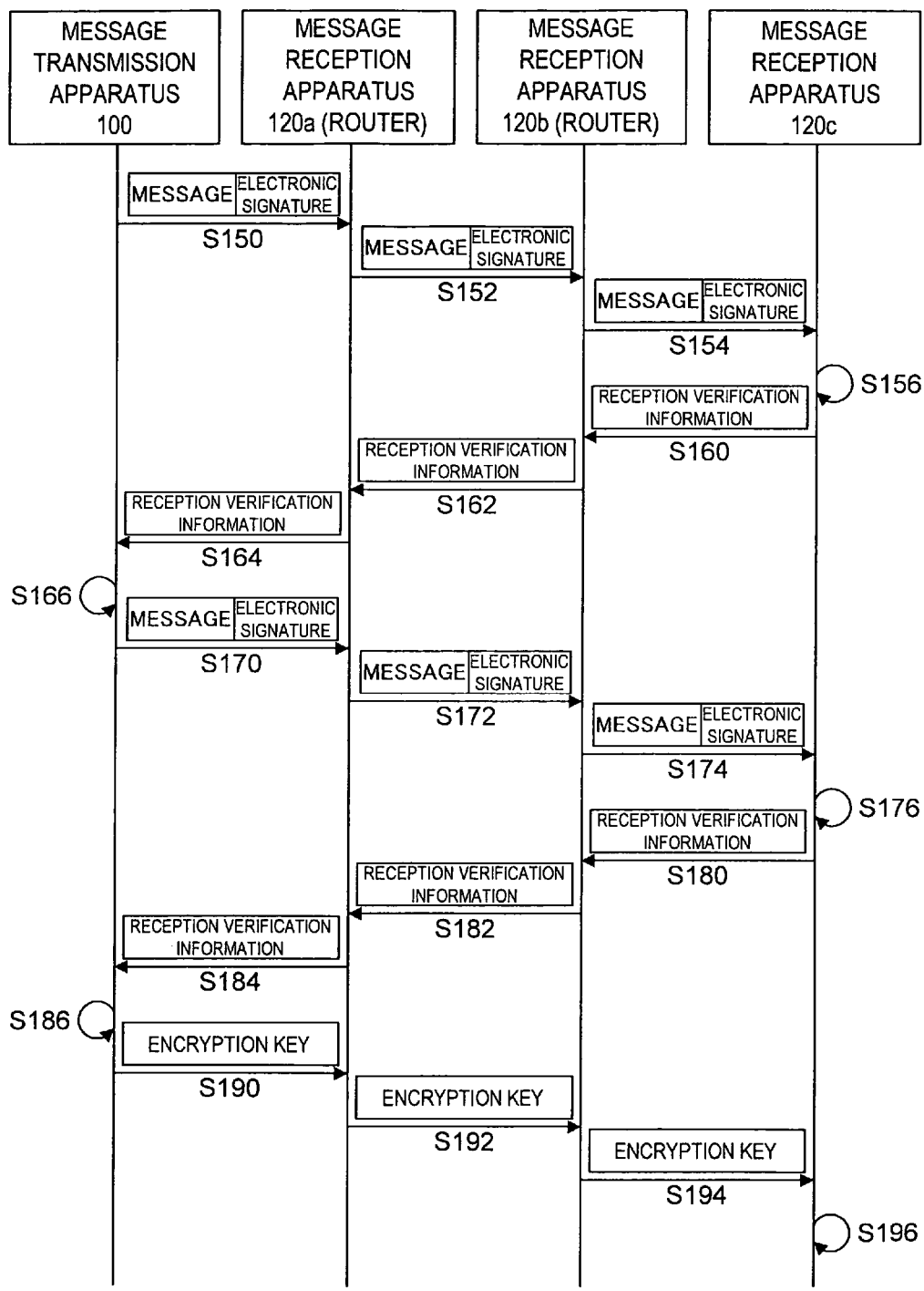
FIG. 2 presents a flowchart of the operation executed in a message authentication system adopting the event count synchronization method.

FIG. 2 presents a flowchart of the operation executed in the message authentication system adopting the event count synchronization method. The explanation is now given in reference to the flowchart on a message transmission flow through which a message is communicated from the message transmission apparatus 100 to a terminal message reception apparatus 120c via two message transmission apparatuses, i.e., message reception apparatuses 120a and 120b.

After generating an electronic signature for a message to be transmitted by using an authentication key, the message transmission apparatus 100 broadcasts the message and the electronic signature. The message and the electronic signature reach the message reception apparatus 120c (S154) via the message reception apparatuses 120a and 120b (S150 and S152). The message reception apparatus 120c saves the message and the electronic signature having been received and transmits reception verification information verifying the arrival of the message as a reply to the message transmission apparatus 100 (S156, S160, S162 and S164).

The message transmission apparatus 100 having received the reception verification information verifies that the message has arrived at the message reception apparatus 120c and counts the message as a sent message (S166). Next, the message transmission apparatus 100 transmits another set of a message and an electronic signature (S170, S172 and S174) and the message reception apparatus 120c transmits a reply similar to that explained above (S176, S180, S182 and S184).

Then, as the number of sent messages and the number of sets of reception verification information having been counted both reach a predetermined value (two in this example) (S186), the message transmission apparatus 100 transmits to the message reception apparatus 120c the authentication key having been used to generate the electronic signatures for the sent messages (S190, S192 and S194). The message reception apparatus 120c uses this authentication key to encrypt the messages having been received and saved, and authenticates the messages by comparing the encryption results with the electronic signatures having been received.

While the explanation above is simplified by focusing on the message transmission from the message transmission apparatus 100 to the message reception apparatus 120c, it is obvious that similar processing is also executed between the message transmission apparatus 100 and the message reception apparatus 120a and between the message transmission apparatus 100 and the message reception apparatus 120b.

Details of such processing may be better understood by referring to Japanese Patent Application No. 2004-324094 filed by the applicant of the present invention.

Through the data flow described above, the message transmission apparatus 100 transmits the authentication key only after verifying that the messages and the electronic signatures have been received at each message reception apparatus 120. This authentication key is not published when the messages and the electronic signatures are transmitted, and thus, even if an illegal user posing as the message transmission apparatus transmits an illegal message, the illegal message does not match up with an electronic signature having been previously transmitted. As a result, a safe environment where only legal messages are transmitted and received is created.

However, in such a message authentication system all the messages having been transmitted from the message transmission apparatus 100 to be held at the message reception apparatus 120 until the authentication key reaches (broadcast to) the message reception apparatus 120, and the cost of storing the messages at the message reception apparatus 120 is significant.

In the embodiment, the message transmission is synchronized with the timing with which the authentication key is transmitted so as to eliminate the need to hold the messages at the message reception apparatus 120 before the authentication key is published and consequently minimize the message memory occupancy rate.

(Message Transmission Apparatus 100)

Figure 3:
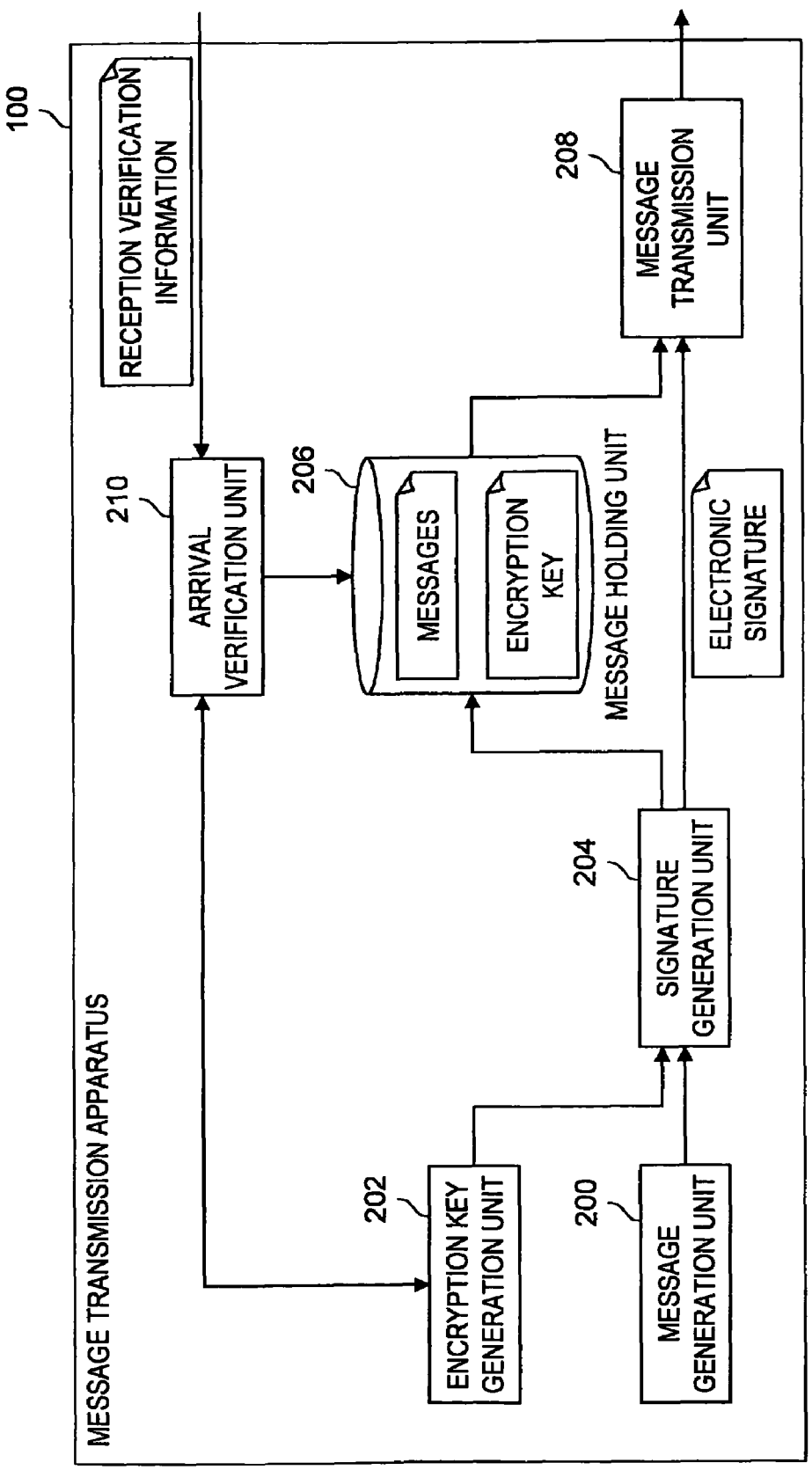
FIG. 3 is a block diagram schematically showing the structure of the message transmission apparatus achieved in the first embodiment.

FIG. 3 is a block diagram schematically illustrating the structure adopted in the message transmission apparatus 100 achieved in the first embodiment. The message transmission apparatus 100 comprises a message generation unit 200, an authentication key generation unit 202, a signature generation unit 204, a message holding unit 206, a message transmission unit 208 and an arrival verification unit 210. The message transmission apparatus 100 first transmits an electronic signature as a notification for a message transmission and, after a predetermined time lag during which the message transmission apparatus 100 verifies the reception of the electronic signature constituting the notification of the transmission at the message reception apparatus 120, the message transmission apparatus 100 transmits the actual message and an authentication key to be used to verify the electronic signature.

The message generation unit 200 generates a message to be broadcast by the message transmission apparatus 100 to each message reception apparatus 120. The message may be generated by using data entered through a user interface or may be generated by directly using an existing document. In addition, the message itself may be encrypted. The message generation unit 200 transfers the generated message to the signature generation unit 204.

As the number of electronic signatures having been generated at the signature generation unit 204 becomes equal to a predetermined value, the authentication key generation unit 202 sequentially extracts an authentication key from an authentication key chain constituted with a plurality of authentication keys and updates the authentication key at the signature generation unit 204. In addition, the authentication key generation unit 202 manages the authentication key chain and the authentication keys and is able to distinguish private authentication keys from public authentication keys in the authentication key chain. Accordingly, it is capable of transmitting to the arrival verification unit 210 the update history when the authentication key is updated in correspondence to each set of the predetermined number of messages. The authentication key may be constituted with numerals or symbols and the authentication key itself may be further encrypted.

In the message transmission apparatus adopting the structure described above, the authentication key is updated in correspondence to each message or each set of a predetermined number of messages, and even if the authentication key is leaked at some point, an illegal act cannot be committed continuously. In addition, by handling the timing with which the authentication key is updated, e.g., the number of the electronic signatures generated before the authentication key is updated, as common information shared with each message reception apparatus, any message held back at an illegal intermediary message reception apparatus can be detected.

The authentication keys constituting the authentication key chain may be sequentially generated by applying a one-way function to a preset initial authentication key and, in such a case, the authentication key generation unit may extract the authentication key in the reverse order from the order in which the authentication keys have been generated.

Figure 4:
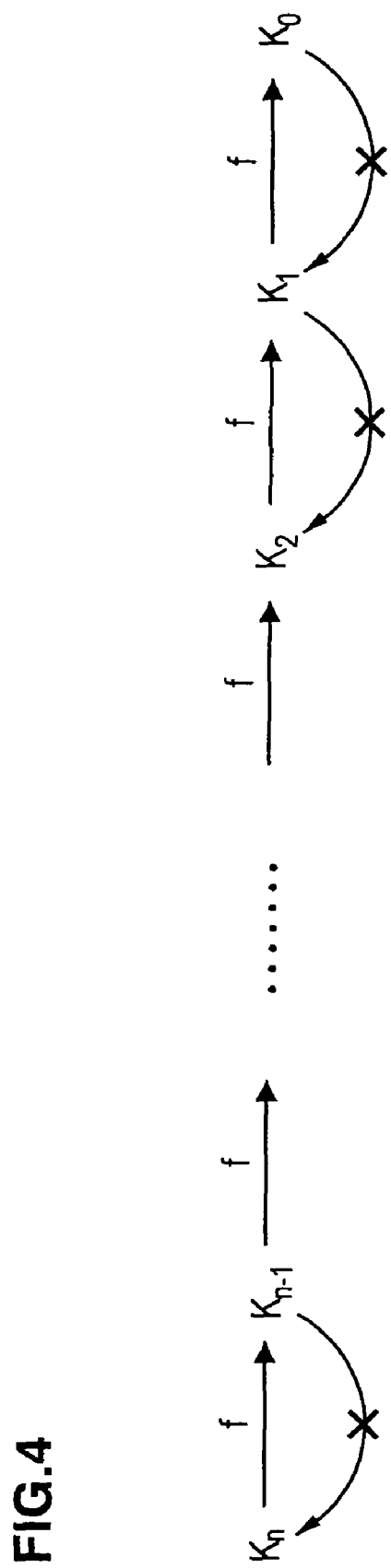
FIG. 4 illustrates an authentication key chain obtained by applying a one-way function.

FIG. 4 illustrates an authentication key chain generated by applying a one-way function f as described above. The message transmission apparatus 100 possesses a specific initial authentication key $K_n$ and sequentially generates an authentication key by applying the one-way function f that allows the authentication key to be uniquely obtained along one direction but does not allow any authentication key to be deduced along the reverse direction, such as a hash function, e.g., MD5 (message digest 5) or SHA-1 (secure hash algorithm 1). Accordingly, an authentication key chain with n+1 authentication keys, $K_n, K_{n-1}, \ldots K_2, K_1$ and $K_0$, is generated as shown in FIG. 4. It is to be noted that the arithmetic operation to obtain $K_{n-1}$ from $K_n$ may be executed by applying the one-way function f a plurality of times instead of just once. Then, the authentication key generation unit 202 extracts the authentication key in the order which is the reverse of the order with which the authentication keys have been generated, i.e., $K_n, K_{n-1}, \ldots K_2, K_1$ and $K_0$. In other words, one of these authentication keys is extracted to be used as the authentication key in the order of $K_0, K_1, K_2 \ldots K_{n-1}, K_n$.

The authentication key chain is generated as described above so that the private authentication key $K_1$ to be used in conjunction with the current message cannot be deduced from a public authentication key, e.g., $K_0$, and thus, a valid electronic signature for the message cannot be generated anywhere except at the message transmission apparatus 100, not even at the message reception apparatuses 120. In addition, when the message must be authenticated at the message reception apparatus 120, the current authentication key $K_1$ is published and, based upon the authentication key $K_1$, the preceding authentication key $K_0$ can be obtained by applying the one-way function f (shared by the message transmission apparatus and the message reception apparatus) thereby making it possible to match up the authentication key. This point is to be described in detail later.

The signature generation unit 204 generates an electronic signature to be used to certify the message provided by the message generation unit 200 by using the authentication key provided by the authentication key generation unit 202. The encryption may be executed by adopting an MAC (message authentication code) generation algorithm such as a CBC-MAC (cipher block chaining-message authentication code) algorithm in which block codes such as AES codes are used. Then, it transmits the message to the message holding unit 206 in correlation to the authentication key and the electronic signature, and also transmits the electronic signature alone to the message transmission unit 208. The electronic signature generated at the signature generation unit 204 is used as a message authenticator and is constituted with numerals or symbols.

The signature generation unit 204 in the embodiment is allowed to transmit to the message holding unit 206 the authentication key to be used to generate the electronic signature as well as the message. The authentication key may be managed at the message holding unit 206 to be detailed later or it may be managed by the message transmission apparatus 100 itself or at the authentication key generation unit 202, as long as the authentication key can be referenced with the timing with which the message transmission unit 208 transmits the authentication key.

The message holding unit 206 holds the message in correlation to the authentication key and the electronic signature. In addition, it is allowed to hold the authentication key having been used to encrypt the message together with the message. In response to a command issued by the arrival verification unit 210 to be detailed later, the message holding unit 206 transmits the message and/or the authentication key to the message transmission unit 208.

The message transmission unit 208 transmits the electronic signature having been provided by the signature generation unit 204 to the message reception apparatus 120 and also transmits to the message reception apparatus 120 the message and the authentication key having been provided by the message holding unit 206. The message is transmitted with a predetermined time lag following the transmission of the electronic signature. In this embodiment, the message is transmitted after processing for verifying that the electronic signature constituting a transmission notification has been received at the message reception apparatus 120 is executed.

The message transmission unit 208 may transmit the message and the authentication key simultaneously. In addition, it may transmit them together with the electronic signature generated for the next message, i.e., the electronic signature encrypted by using the updated authentication key.

If the signature generation unit 204 generates a predetermined number of electronic signatures in correspondence to the predetermined number of messages by using a single authentication key, the message transmission unit 208 may transmit the predetermined number of messages together with the common authentication key shared for the predetermined number of messages. Namely, the authentication key may be transmitted only once in correspondence to the predetermined number of messages the electronic signatures for which are generated by using the common authentication key. When the authentication key is updated in correspondence to each set of the predetermined number of messages, a single authentication key is used for the predetermined number of messages and thus, only one authentication key needs to be transmitted in correspondence to the predetermined number of messages.

The arrival verification unit 210 receives from the message reception apparatus 120 reception verification information indicating that an electronic signature has been successfully received at the message reception apparatus 120, judges whether or not the electronic signature correlated with the message has arrived at the message reception apparatus 120 and engages the message transmission unit 208 to transmit the message and the authentication key correlated to the message if the electronic signature is judged to have arrived.

The arrival judgment may be executed by adopting any of various methods. For instance, the message reception apparatus 120 may send back reception verification information containing the electronic signature so as to enable the message transmission apparatus 100 to compare the electronic signature having been received from the message reception apparatus with the electronic signature held at the message transmission apparatus 100. Alternatively, an index having been attached to the electronic signature at the message transmission apparatus 100 may be returned as part of the reception verification information and the message transmission apparatus 100 may compare the index in the reception verification information with the index held therein.

In addition, if the authenticity of the reception verification information itself is questionable (if there is any concern that the reception verification information has been forged), the reception verification information having been received at the message transmission apparatus may be authenticated by using a private key pair shared by the message transmission apparatus and the message reception apparatus to encrypt the reception verification information or to generate and attach an electronic signature for the reception verification information.

The arrival verification unit 210 having verified the arrival of the electronic signature may transmit only the information corresponding to the electronic signature in the reception verification information to the message holding unit 206. In such a case, the message holding unit 206 transmits the message and the authentication key corresponding to the information related to the electronic signature having been provided thereto to the message transmission unit 208.

In the message transmission apparatus 100 adopting a structure in which the authentication key generation unit 202 updates the authentication key each time a predetermined number of electronic signatures have been generated at the signature generation unit 204, the arrival verification unit 210 may engage the message transmission unit 208 to transmit the predetermined number of messages corresponding to the electronic signatures and held at the message holding unit 206 and the common authentication key shared for the messages only when the number of sets of reception verification information having been received equals the predetermined number.

In addition, upon obtaining the predetermined number of sets of reception verification information from the message reception apparatus 120, the arrival verification unit 210 may provide the authentication key generation unit 202 with information indicating that the predetermined number of sets of reception verification information have been obtained. Then, the authentication key generation unit 202 may update the authentication key upon receiving the information. In this case, the pre-update authentication key is published to each message reception apparatus simultaneously as the updated authentication key is transmitted to the signature generation unit 204, thereby achieving authentication key synchronization within the message transmission apparatus 100.

The reception verification information allows the message transmission apparatus 100 to verify that information such as the electronic signature having been transmitted has successfully arrived at each message reception apparatus 120. Only when the verification results are affirmative, can the message and the authentication key be transmitted. Since the authentication key remains unknown when the electronic signature is transmitted, an illegal message transmitted from an illegal source posing as the message transmission apparatus does not match up with the previously transmitted electronic signature.

The present invention also provides a program and a storage medium containing the program, which enable a computer to function as the message transmission apparatus 100 described above.

(Message Reception Apparatuses 120)

Figure 5:
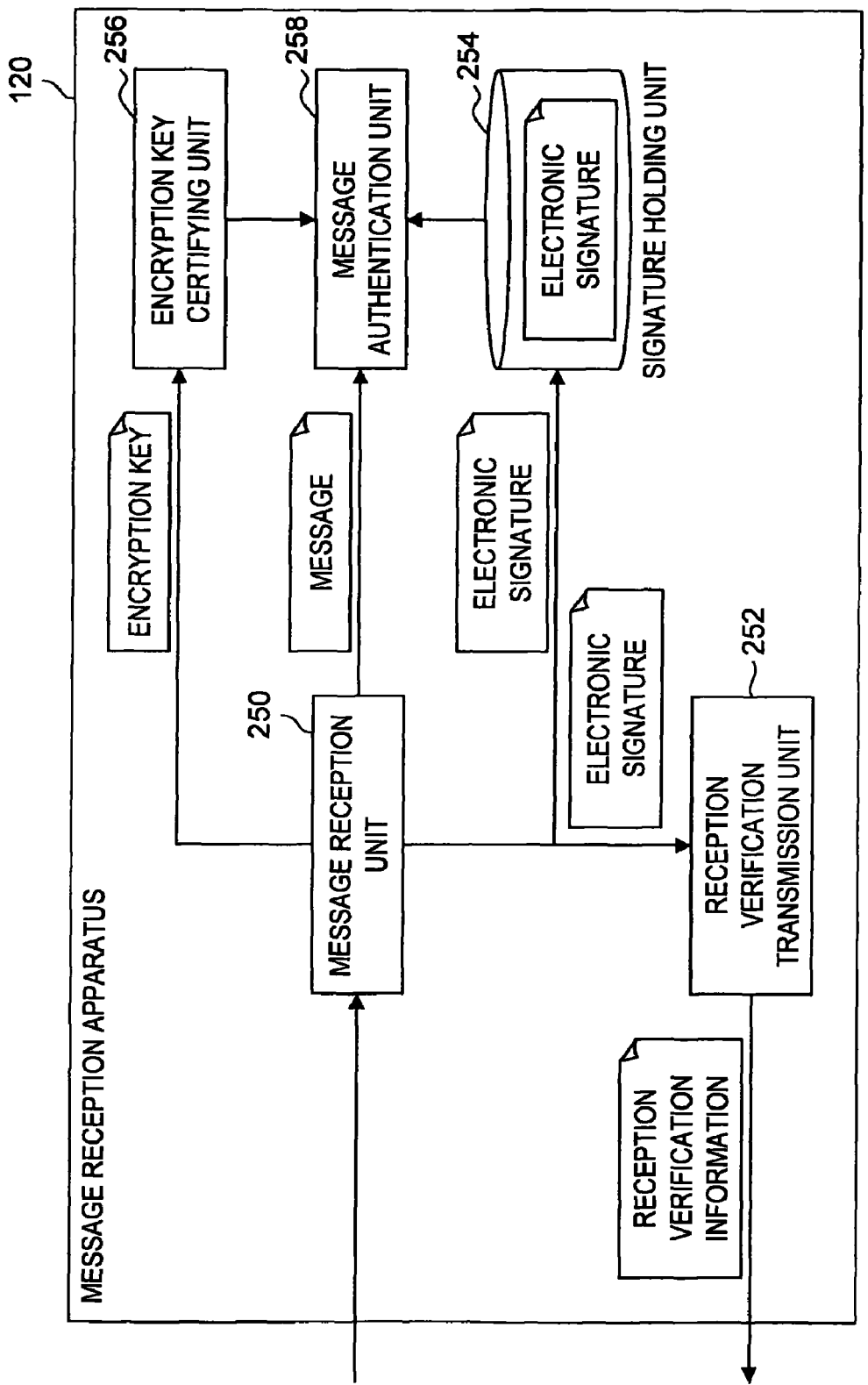
FIG. 5 is a block diagram schematically showing the structure of a message reception apparatus achieved in a first embodiment.

FIG. 5 is a block diagram schematically illustrating the structure that may be adopted in the message reception apparatuses 120 in the first embodiment. The message reception apparatuses 120 each comprise a message reception unit 250, a reception verification transmission unit 252, a signature holding unit 254, an authentication key certifying unit 256 and a message authentication unit 258. The message reception apparatus 120 having received an electronic signature constituting a notification of a message transmission transmits the reception verification information confirming the reception as a reply in preparation for a further reception of the message and the authentication key. The message having been received is then authenticated based upon the authentication key and the electronic signature.

The message reception unit 250 receives the electronic signature transmitted from the message transmission apparatus 100, and it also receives the message and the authentication key transmitted with the predetermined time lag. The received electronic signature is transmitted to the reception verification transmission unit 252 and the signature holding unit 254, the received message is transmitted to the message authentication unit 258 and the received authentication key is transmitted to the authentication key certifying unit 256.

The reception verification transmission unit 252 receives the electronic signature from the message reception unit 250 and generates reception verification information indicating that the electronic signature has been successfully received. It then transmits the reception verification information having been generated to the message transmission apparatus 100.

The message reception apparatus 120 adopting the structure described above is able to send a reply to the message transmission apparatus 100, indicating that the electronic signature constituting a message transmission notification has been received and, once the reception verification information is transmitted, the message reception apparatus 120 is ready to receive the message and the authentication key. Since the authentication key is not published when the electronic signature is transmitted, the reception of any illegal message can be detected.

The signature holding unit 254 holds the electronic signature provided by the message reception unit 250. At this time, the signature holding unit 254 also ascertains the order with which the electronic signature has been received at the message reception unit 250, i.e., the order with which the electronic signature has been transmitted from the message transmission apparatus 100. In addition, after a predetermined length of time elapses, the signature holding unit 254 transmits to the message authentication unit 258 the electronic signatures held therein in the order in which they were received, with the timing with which the messages are authenticated.

The authentication key certifying unit 256 certifies that the authentication key provided by the message reception unit 250 is a key in the authentication key chain managed by the valid message transmission apparatus 100. More specifically, it verifies that the authentication key is a key having been updated in correspondence to a set of the predetermined number of electronic signatures or messages. If the authentication key has not been updated in correspondence to the set of the predetermined number of electronic signatures or messages, the authentication key certifying unit 256 does not certify that the authentication key has been transmitted from the message transmission apparatus 100.

The authentication key certifying unit 256 may hold the authentication key and in the event of an authentication key update it may apply the one-way function f to the updated authentication key a given number of times. Then it may compare the arithmetic operation results with the value indicated by the previous authentication key having been held and if they do not match the authentication key certifying unit 256 may withhold a certification that the authentication key has been transmitted from the message transmission apparatus 100. The authentication key certifying unit 256 structured as described above is thus able to check the updated authentication key to ascertain whether or not it is a valid authentication key.

The message transmission apparatus 100 holds the authentication key chain that includes the authentication keys $K_0$, $K_1$, $K_2$, ... $K_{n-1}$ and $K_n$ as explained earlier, and after transmitting a series of electronic signatures encrypted by using, for instance, the authentication key $K_1$, it publishes the authentication key $K_1$ with a timing with which the authentication key $K_1$ is updated to the authentication key $K_2$.

Figure 6:
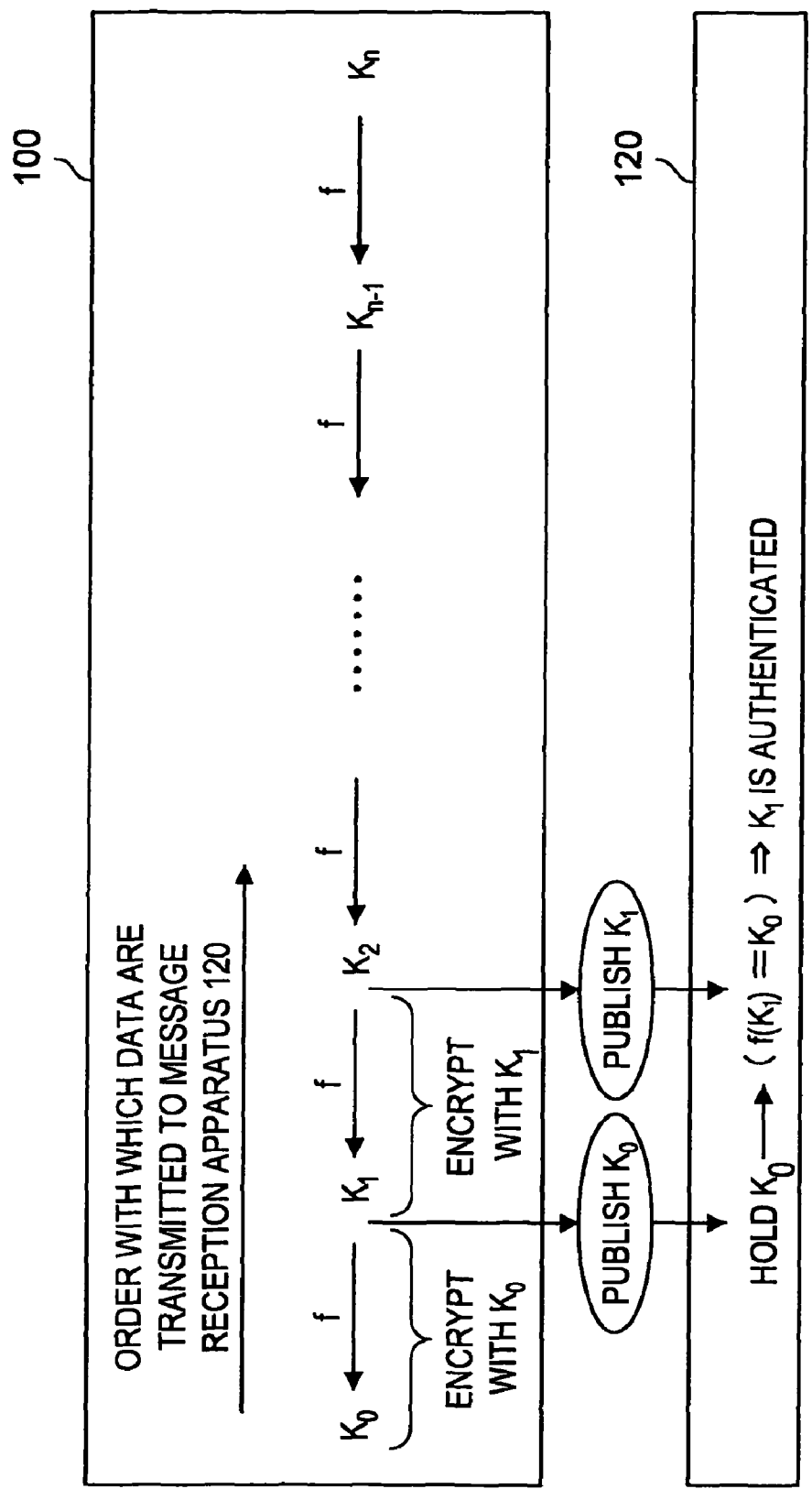
FIG. 6 illustrates the certification of the authentication key obtained by applying a one-way function.

FIG. 6 illustrates how an authentication key is certified by using the one-way function f described earlier. To explain the authentication key certification in reference to FIG. 6, the message reception apparatus 120, holding the authentication key $K_0$, receives electronic signatures encrypted by using the authentication key $K_1$. After a series (the predetermined number) of electronic signatures are received, the authentication key $K_1$ is published. The authentication key $K_0$ should be obtained by applying the same one-way function f used at the message transmission apparatus 100 a given number of times in an arithmetic operation executed on the authentication key $K_1$. Accordingly, the authentication key $K_1$ is judged to be a valid authentication key if $f(K_1)=K_0$, and in this case, the authentication key $K_1$ is used in the subsequent processing. In addition, the authentication key $K_1$ is held to be used to authenticate the next authentication key $K_2$.

Since the still unknown authentication key $K_1$ to be used in conjunction with the current message cannot be deduced from an authentication key that has already been published, e.g., $K_0$, a valid electronic signature for the current message cannot be generated by parties including the message reception apparatus 120, and it can be generated only at the message transmission apparatus 100.

the message authentication unit 258 authenticates the message provided by the message reception unit 250 as a valid message having been generated at the message transmission apparatus 100. Accordingly, the message authentication unit 258 generates a new electronic signature for the message received at the message reception unit 250 by using the authentication key having been received together with the message and authenticates the message by comparing the new electronic signature with the electronic signature held at the signature holding unit 254. If the authentication key is a common key shared by a predetermined number of messages, the message authentication unit 258 authenticates the predetermined number of messages by using the common key. The predetermined number is set in advance through an agreement between the message transmission apparatus 100 and the message reception apparatus 120.

The present invention further provides a program and a storage medium containing the program, which enable a computer to function as the message reception apparatus 120.

(Message Transmission Method, Message Reception Method)

Next, the message transmission method for transmitting messages to a plurality of message reception apparatuses from the message transmission apparatus through the multi-hop communication achieved in the first embodiment and the message reception method for receiving the messages through the multi-hop communication are explained.

Figure 7:
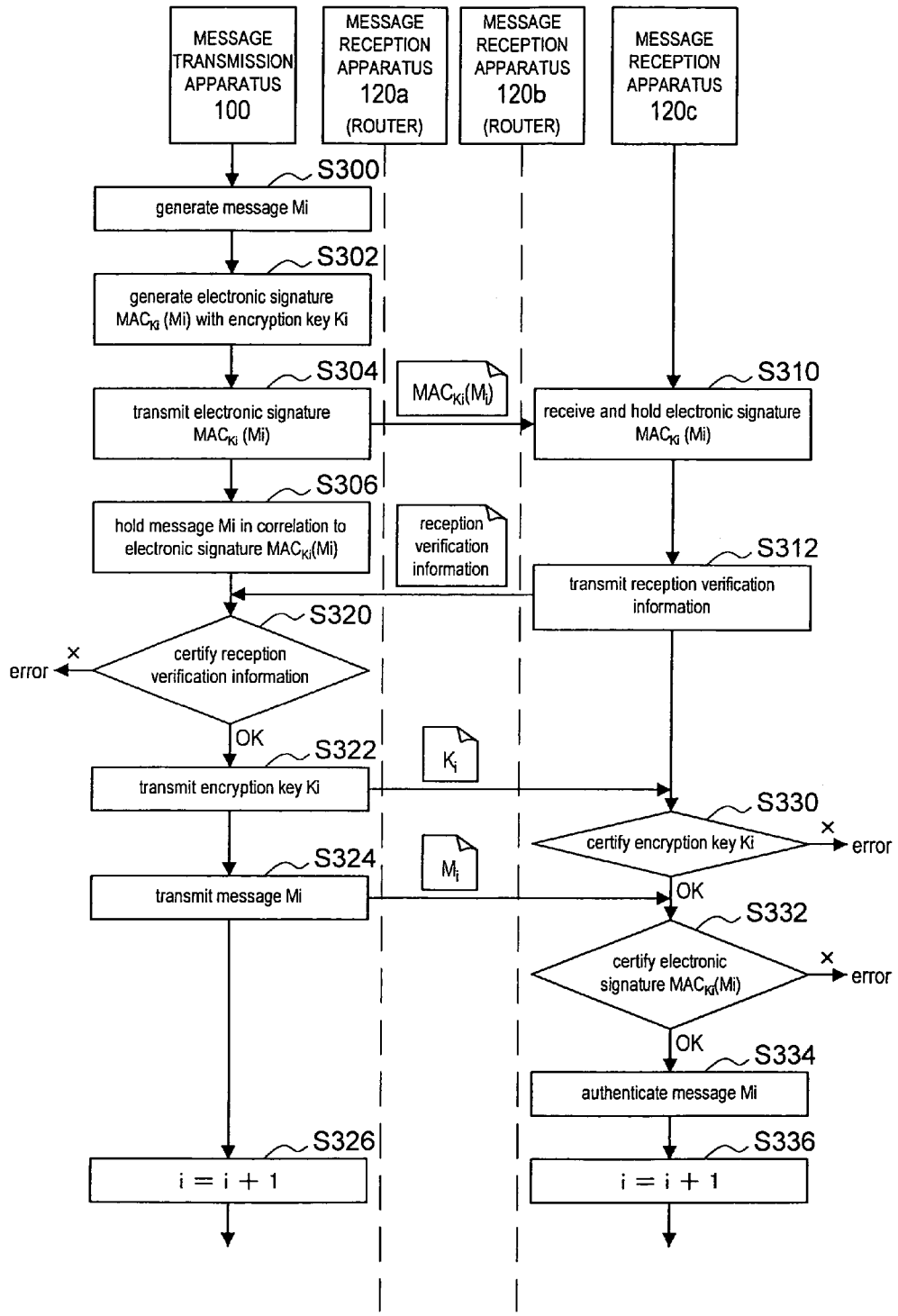
FIG. 7 presents a flowchart of the processing executed by adopting the message transmission/reception methods.

FIG. 7 presents a flowchart of the processing executed by adopting the message transmission method and the message reception method. The message transmission apparatus 100 first generates a message $M_i$ (S300) and also generates an electronic signature $MAC_{Ki}$ ($M_i$) for the message $M_i$ by using an authentication key $K_i$ (through encryption) unknown to the individual message reception apparatuses 120 (the network) (S302). "i" represents an integer. The message transmission apparatus 100 then transmits the electronic signature $MAC_{Ki}$ ($M_i$) having been generated to the message reception apparatus 120c (S304) and holds the message $M_i$ in the message transmission apparatus 100 itself in correlation to the electronic signature $MAC_{Ki}$ ($M_i$) (S306). The authentication key $K_i$ is an authentication key having been extracted in sequence from the authentication key chain having been generated by using the one-way function as explained earlier. This means that while $K_i$ can be generated based upon $K_{i+1}$, $K_{i+1}$ cannot be deduced from $K_i$.

The message reception apparatus 120c receives the electronic signature $MAC_{Ki}$ ($M_i$), holds the electronic signature $MAC_{Ki}$ ($M_i$) until the authentication key $K_i$ is transmitted (S310) and sends reception verification information indicating that the electronic signature $MAC_{Ki}$ ($M_i$) has been successfully received as a reply to the message transmission apparatus 100 (S312). The message reception apparatus 120c is cognizant of the place of the electronic signature $MAC_{Ki}$ ($M_i$) in the reception order.

The message transmission apparatus 100 judges whether or not the electronic signature $MAC_{Ki}$ ($M_i$) has arrived at the message reception apparatus 120c by checking the reception verification information (S320), and decides that the authentication key $K_i$ is to be published to the individual message reception apparatuses (the network) if the electronic signature is judged to have arrived, and transmits the authentication key $K_i$ to the message reception apparatus 120c (S322). At this time, the authentication key is updated to $K_{i+1}$ to be used to encrypt the next message $M_{i+1}$ and this authentication key $K_{i+1}$, is provided to the signature generation unit 204. In addition, the message $M_i$ is transmitted exactly as the authentication key $K_i$ is transmitted or either before or after the transmission of the authentication key $K_i$ (S324). Once the message is sent, the message transmission apparatus 100 prepares for the transmission of the next message $M_{i+1}$ (S326).

The message reception apparatus 120c certifies the received authentication key $K_i$ (S330). The authentication key is certified by comparing the results obtained by applying the one-way function f in an arithmetic operation executed on the authentication key $K_i$ with the previous authentication key $K_{i-1}$ held at the message reception apparatus 120c. If the two values match, the authentication key $K_i$ is held to be compared with the authentication key $K_{i+1}$ corresponding to the next message $M_{i+1}$, and the operation shifts into the subsequent step. If they do not match, on the other hand, and authentication error occurs and error processing is executed.

If the authentication key $K_i$ having been received is judged to be valid, the electronic signature $MAC_{Ki}$ ($M_i$) having been received from the message transmission apparatus 100 and held at the signature holding unit in the step S310 is verified (S332). The arithmetic operation for verifying the electronic signature $MAC_{Ki}$ ($M_i$) is executed by generating an electronic signature through a procedure identical to the procedure through which the electronic signature was generated at the message transmission apparatus 100 and judging whether or not the newly generated electronic signature matches the electronic signature $MAC_{Ki}$ ($M_i$) held at the message reception apparatus 120c.

Through this process, any alteration of the message $M_i$ or of the electronic signature $MAC_{Ki}(M_i)$ having been transmitted from the message transmission apparatus 100 can be detected. The message $M_i$ having passed this certification step (S332) is authenticated (S334), and the message reception apparatus 120c then starts processing the message $M_i$ and also prepares for the reception of the next message $M_{i+1}$ (S336).

While the explanation above is simplified by focusing on the message transmission from the message transmission apparatus 100 to the message reception apparatus 120c, as in the explanation given in reference to FIG. 2, it is obvious that similar processing is also executed between the message transmission apparatus 100 and the message reception apparatus 120a and between the message transmission apparatus 100 and the message reception apparatus 120b. In addition, while the data transfer from the message transmission apparatus 100 to the message reception apparatus 120c is indicated with straight lines in FIG. 7, data may be transferred to the message reception apparatus 120c via the message reception apparatuses 120a and 120b acting as router message reception apparatuses, as well.

Also, while the authentication key is updated in correspondence to each message in the example explained above, a single authentication key may be used in correspondence to a predetermined number of messages. In such a case, the electronic signature and the reception verification information may be exchanged between the message transmission apparatus 100 and the message reception apparatus 120 for example 10 times and then 10 messages and a single authentication key are transmitted.

Figure 8:
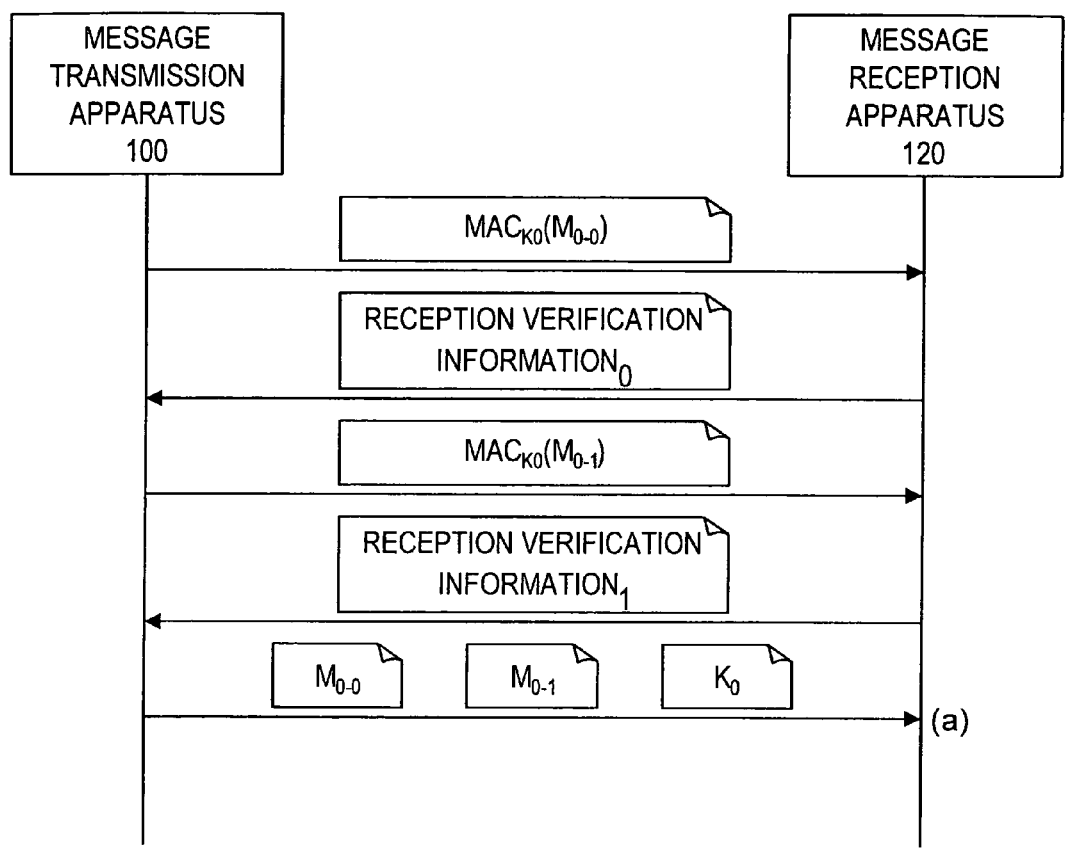
FIG. 8 is a schematic flowchart of the communication between the message transmission apparatus and the message reception apparatus.

FIG. 8 presents a schematic flowchart of the communication between the message transmission apparatus 100 and the message reception apparatus 120 described above. As FIG. 8 indicates, the message transmission apparatus 100 simply transmits electronic signatures the number of which matches the number of messages to the message reception apparatus 120 so that the message reception apparatus 120 does not receive the messages until a time point "a" at which the messages need to be authenticated and does not have to hold the messages prior to the message authentication time point. As a result, the message memory occupancy rate at the message reception apparatus 120 can be minimized.

This feature is particularly effective when the data size of the messages is greater than the data size of the electronic signatures transmitted as transmission notifications.

In addition, the structure described above effectively prevents another message reception apparatus functioning as an intermediary message reception apparatus from tampering with the messages, withholding the messages or posing as the message transmission apparatus.

Figure 9:
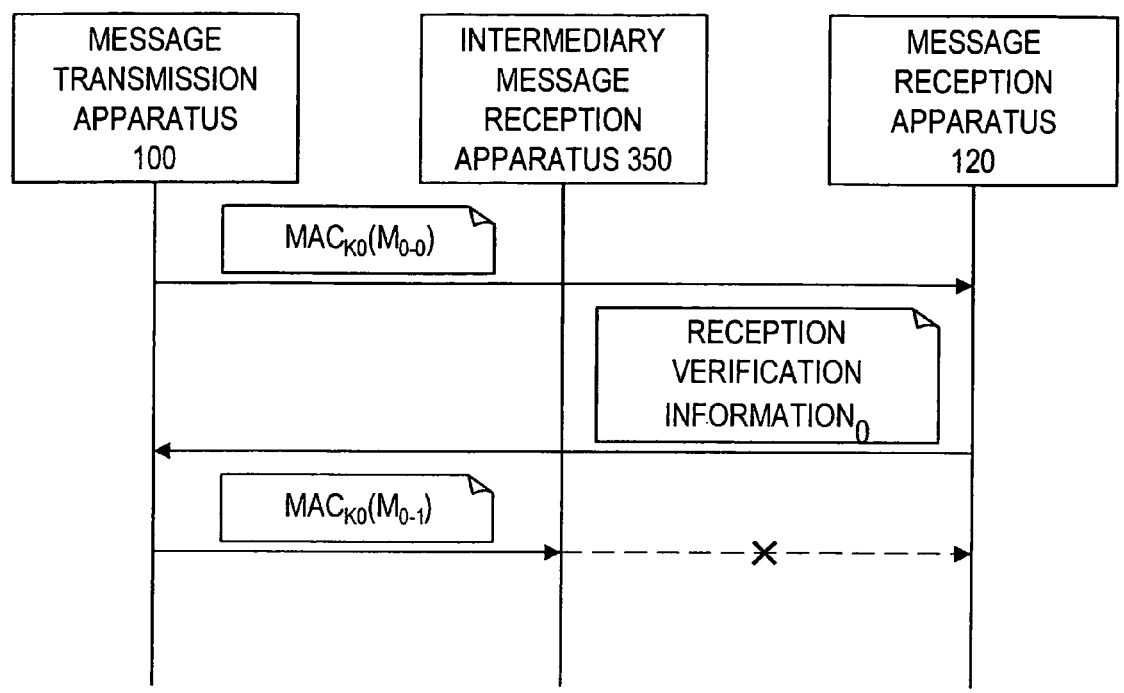
FIG. 9 presents a flowchart of the processing executed to inhibit illegal acts by an intermediary message reception apparatus.

FIG. 9 presents a flowchart illustrating how an illegal act by an intermediary message reception apparatus is prevented. Let us assume that an electronic signature $MAC_{K0}(M_{0-0})$ for a message $M_{0-0}$ originating from the message transmission apparatus 100 has reached the message reception apparatus 120 via an intermediary message reception apparatus 350. The message reception apparatus 120 then transmits reception verification information 0 to the message transmission apparatus 100 via the intermediary message reception apparatus 350. The message transmission apparatus 100 next transmits an electronic signature $MAC_{K0}(M_{0-1})$ for a message $M_{0-1}$, but the intermediary message reception apparatus 350 commits an in illegal act and interrupts the transmission of the electronic signature $MAC_{K0}(M_{0-1})$ to the message reception apparatus 120. Under these circumstances, reception verification information 0 is not transmitted from the message reception apparatus 120, and thus, the message transmission apparatus 100 does not transmit the messages $M_{0-1}$ and $M_{0-1}$.

Even if the intermediary message reception apparatus 350 having committed the illegal act of suspending the transmission of the electronic signature $MAC_{K0}(M_{0-1})$ to the message reception apparatus 120, attempts to pose as the message transmission apparatus 100 and send an illegal message to the message reception apparatus 120 by using the authentication key $K_0$ to be transmitted from the message transmission apparatus 100 later, the reception verification information is certified at the message transmission apparatus 100 without publishing the authentication key $K_0$, making it impossible for the intermediary message reception apparatus 350 from posing as the message transmission apparatus 100.

(Second Embodiment: Message Authentication System Adopting the Time-Point Synchronization Method)

Next, the message authentication system adopting the time-point synchronization method described in (2) is explained.

Figure 10:
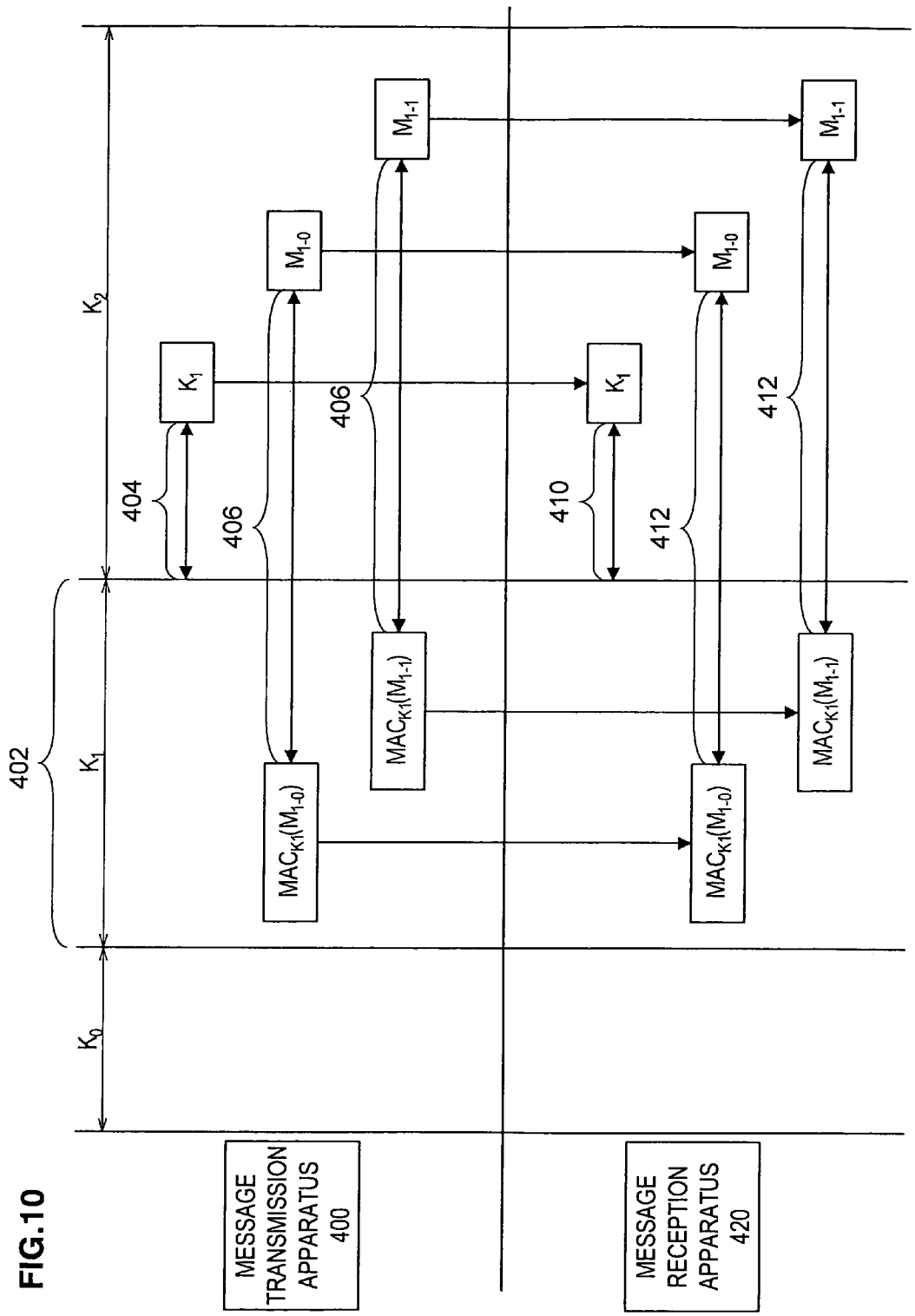
FIG. 10 presents a timing chart of the operation executed in a message authentication system adopting the time-point synchronization method.

FIG. 10 is a timing chart in reference to which the message authentication system adopting the time-point synchronization method is to be explained. In this system, messages are transmitted from a message transmission apparatus 400 to a message reception apparatus 420 directly or via at least one intermediary message reception apparatus. The message transmission apparatus 400, the intermediary message reception apparatus and the message reception apparatus 420 in the system engage in operation in synchronization with one another on a single time axis.

During a period 402 over which an authentication key $K_1$, for instance, is legal, messages $M_{1-0}$ and $M_{1-1}$ to be transmitted are encrypted by using the authentication key $K_1$ within the message transmission apparatus 400. Then, after generating electronic signatures $MAC_{K1}(M_{1-0})$ and $MAC_{K1}(M_{1-1})$ for the messages $M_{1-0}$ and $M_{1-1}$, the message transmission apparatus 400 publishes the electronic signatures $MAC_{K1}(M_{1-0})$ and $MAC_{K1}(M_{1-1})$ to the message reception apparatus 420. After the authentication key is updated, the message transmission apparatus 400 allows a predetermined length of time 404 to elapse and then transmits the authentication key $K_1$ to the message reception apparatus 420. In addition, after individually transmitting the electronic signatures $MAC_{K1}(M_{1-0})$ and $MAC_{K1}(M_{1-1})$, the message transmission apparatus 400 allows a predetermined length of time 406 to elapse following each transmission and then transmits the respective messages $M_{1-0}$ and $M_{1-1}$ to the message reception apparatus 420.

After receiving the individual electronic signatures $MAC_{K1}(M_{1-0})$ and $MAC_{K1}(M_{1-1})$ from the message transmission apparatus 400, the message reception apparatus 420 counts the lengths of time to elapse before the corresponding messages $M_{1-0}$ and $M_{1-1}$ are received. It also counts the length of time to elapse between the time point at which the $K_1$ valid period expires and the time point at which the authentication key $K_1$ having remained undisclosed thus far becomes published. Then, it checks the count values to ensure that the count values, i.e., the transmission time lags 410 and 412 are equal to the predetermined lengths of time 404 and 406 indicated in information it shares with the message transmission apparatus 400.

The messages and the authentication key are transmitted with predetermined time lags in this system so as to disclose the authentication key only after the transmission data have arrived at the most remote message reception apparatus and the prevent another message reception apparatus or a third-party electronic apparatus from falsely posing as the message transmission apparatus. Accordingly, the message transmission apparatus 400 and the message reception apparatus 420 need to agree upon lengths of time, which are significant enough to allow communication between the message transmission apparatus 400 and the message reception apparatus 420 to be completed, to be set as the transmission time lags.

In the message authentication system adopting the time-point synchronization method described above, any illegal act attempted by an intermediary message reception apparatus or another electronic apparatus is bound to be out of sync and thus, only valid messages are authenticated by detecting asynchronous transactions.

While the explanation above is simplified by focusing on the message transmission from the message transmission apparatus 400 to the message reception apparatus 420, it is obvious that similar processing is also executed between the message transmission apparatus 400 and intermediary message reception apparatuses.

In addition, in the message authentication system described above, in which messages are transmitted in coordination with the timing with which the authentication key is transmitted, the message reception apparatus does not need to hold the messages before the authentication key is published, which makes it possible to minimize the message memory occupancy rate.

(Message Transmission Apparatus 400)

Figure 11:
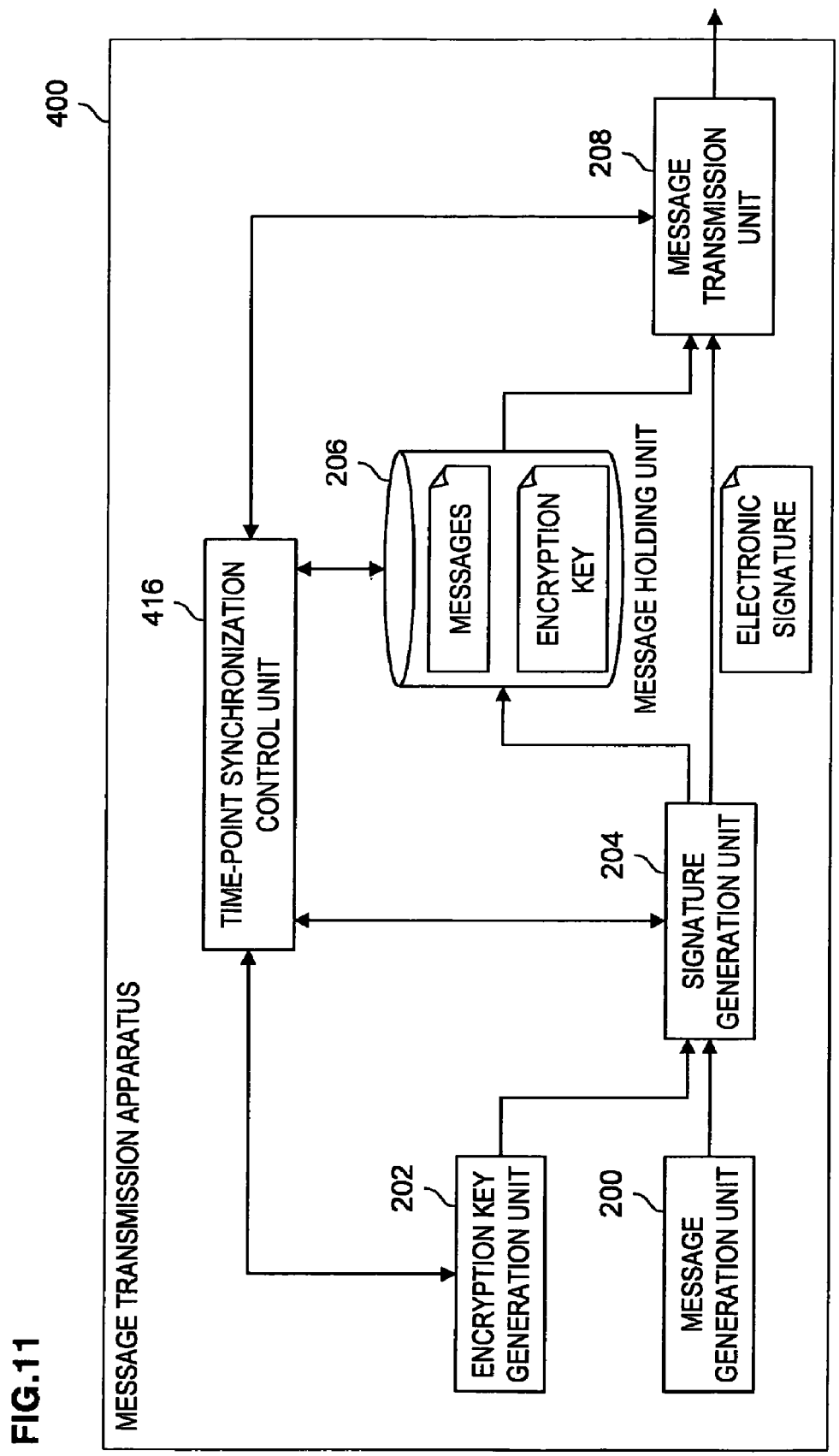
FIG. 11 is a block diagram schematically showing the structure of the message transmission apparatus achieved in a second embodiment.

FIG. 11 is a block diagram schematically illustrating the structure adopted in the message transmission apparatus 400 achieved in the second embodiment. The message transmission apparatus 400 comprises a message generation unit 200, an authentication key generation unit 202, a signature generation unit 204, a message holding unit 206, a message transmission unit 208 and a time-point synchronization control unit 416. The message transmission apparatus 400 first transmits an electronic signature as a notification for a message transmission and, after a predetermined time lag, i.e., a transmission time lag with which the message is transmitted following the transmission of the electronic signature and a transmission time lag with which the pre-update authentication key is transmitted following the authentication key update, the message transmission apparatus 400 transmits the actual message and the authentication key to be used to verify the electronic signature.

Since the message generation unit 200, the authentication key generation unit 202, the signature generation unit 204, the message holding unit 206 and the message transmission unit 208 have functions substantially identical to those of the components of the first embodiment, a repeated explanation thereof is omitted and the following explanation focuses on the time-point synchronization control unit 416 with functions unique to the second embodiment.

Upon establishing time-point synchronization with each message reception apparatus 420, the time-point synchronization control unit 416 manages the authentication key valid (utilization) period at the authentication key generation unit 202, the transmission time lag with which messages are transmitted following the transmissions of the corresponding electronic signatures and the transmission time lag with which the pre-update authentication key is transmitted following the authentication key update, and engages the message transmission unit 208 to transmit the messages and the authentication key correlated with the messages with the transmission time lags.

More specifically, the time-point synchronization control unit 416 indicates to the authentication key generation unit 202 the timing with which the authentication key is to be updated, and the authentication key generation unit 202, in turn, extracts a new authentication key from the authentication key chain with the indicated timing. In addition, the time-point synchronization control unit 416 issues instructions for the message holding unit 206 to transmit the authentication key with the predetermined transmission time lag following the authentication key update and to transmit the messages with the predetermined transmission time lag following the transmissions of the corresponding electronic signatures.

The message transmission apparatus adopting the structure described above is able to establish time-point synchronization with the individual message reception apparatuses 420 so as to allow messages and the authentication key to be exchanged with coordinated timing. As a result, a message that has been tampered with at an illegal message reception apparatus or another electronic apparatus can be detected since its timing is bound to be uncoordinated with the established time-point synchronization.

As explained earlier in reference to the first embodiment, the authentication key may be held at the message holding unit 206 in correlation to the messages, or the authentication key may be managed at the message transmission apparatus 400 itself or at the authentication key generation unit 202, as long as the authentication key can be referenced with the timing with which the authentication key is transmitted via the message transmission unit 208.

The present invention also provides a program and a storage medium containing the program, which enable a computer to function as the message transmission apparatus 400 described above.

(Message Reception Apparatuses 420)

Figure 12:
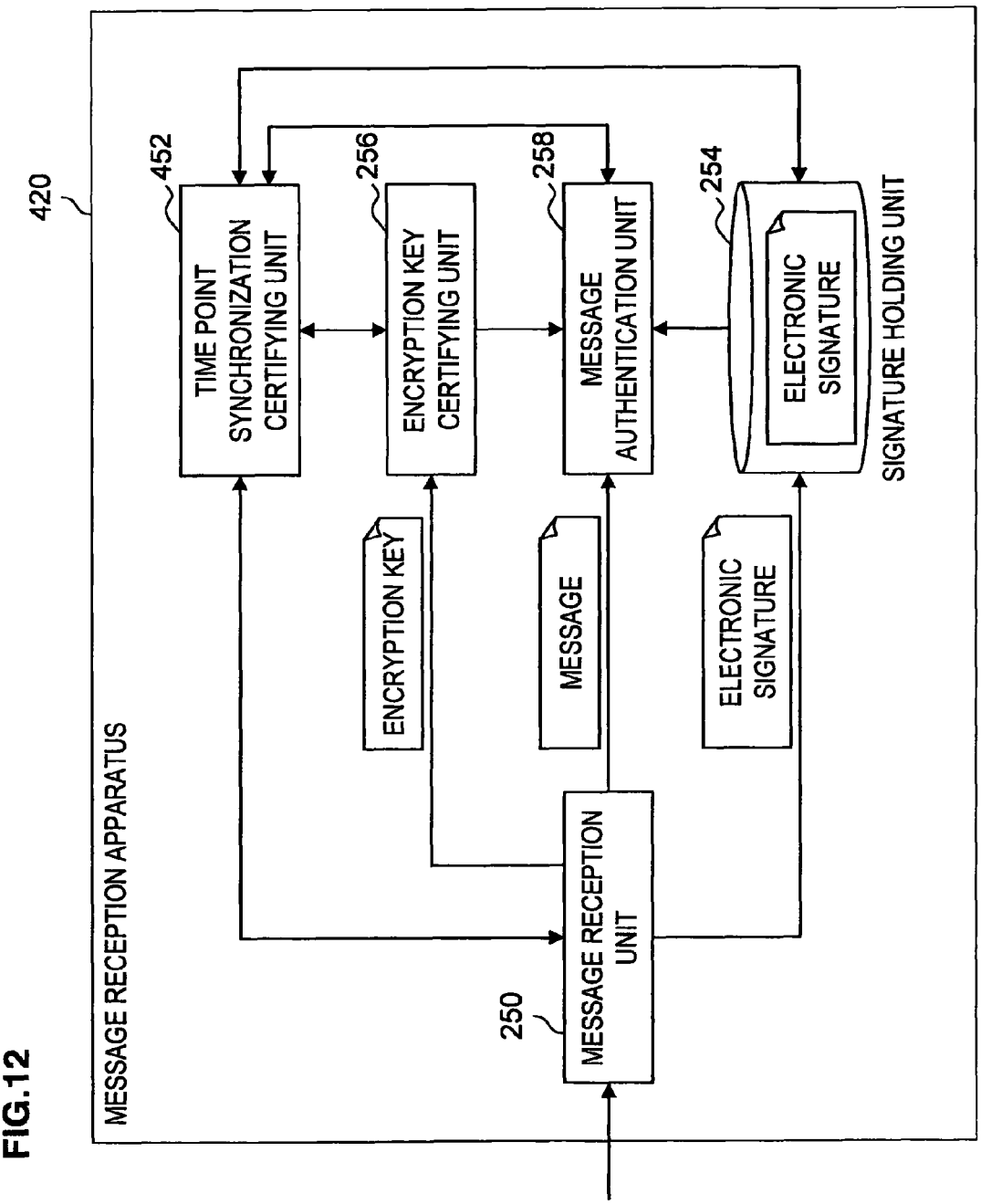
FIG. 12 is a block diagram schematically showing the structure of a message reception apparatus achieved in the second embodiment.

FIG. 12 is a block diagram schematically illustrating the structure that may be adopted in the message reception apparatus 420 achieved in the second embodiment. The message reception apparatus 420 comprises a message reception unit 250, a signature holding unit 254, an authentication key certifying unit 256, a message authentication unit 258 and a time-point synchronization certifying unit 452. After receiving an electronic signature constituting a message transmission notification, the message reception apparatus 420 authenticates the message by checking the timing with which the message and the authentication key are subsequently received.

Since the message reception unit 250, the signature holding unit 254, the authentication key certifying unit 256 and the message authentication unit 258 have functions substantially identical to those of the components of the first embodiment explained earlier, a repeated explanation thereof is omitted and the following explanation focuses on the time-point synchronization certifying unit 452 with new functions unique to the second embodiment.

The time-point synchronization certifying unit 452 first receives time-point synchronization information and time-point control information transmitted from the message transmission apparatus 400 via the message reception unit 250 and establishes time-point synchronization with the message transmission apparatus 400. It also holds as common information the authentication key valid (utilization) period at the message transmission apparatus 400, the message transmission time lag with which messages are transmitted following the transmissions of the corresponding electronic signatures and the authentication key transmission time lag with which the pre-update authentication key is transmitted following the authentication key update, all indicated in the time-point control information.

After establishing the time-point synchronization with the message transmission apparatus 400, the time-point synchronization certifying unit 452 checks the timing of the receptions of a message and the authentication key to ascertain whether or not the message and the authentication key have been received respectively with the message transmission time lag following the transmission of the corresponding electronic signature and the authentication key transmission time lag following the authentication key update agreed upon between the message reception apparatus 420 and the message transmission apparatus 400 and held as common information. If either reception time point is out of sync by an extent greater than a predetermined range, the message is not authenticated.

In other words, the message is authenticated at the time-point synchronization certifying unit 452 by establishing the time-point synchronization and ascertaining as to whether or not the message and the authentication key having arrived at the message reception unit 250 have been received with time lags matching the predetermined transmission time lags, as has been explained in reference to FIG. 10. The time-point synchronization certifying unit 452 starts the count upon receiving the electronic signature and compares the transmission time lag with which the message is received with the predetermined length of time in order to certify the message. It also counts the length of time elapsing between the authentication key update time point set in synchronization with the message transmission apparatus 400 and the time point at which the pre-update authentication key is received and compares the authentication key transmission time lag with the predetermined length of time in order to certify the authentication key.

While the authentication key is certified based upon the length of time to elapse before it is received following the authentication key update time point in the example explained above, the present invention is not limited to this example and it may instead be certified based upon the length of the authentication key transmission time lag elapsing after the transmission of the electronic signature. In addition, while the time-point synchronization certifying unit 452 is engaged to check the message transmission time lag and the authentication key transmission time lag, the transmission time lags may be checked by the message authentication unit 258 or the authentication key certifying unit 256 instead. During this process, the signature holding unit 254 is able to hold the time point at which the electronic signature is received at the message reception unit 250 in correlation to the message.

The message reception apparatus adopting the structure described above is able to establish time-point synchronization with the message transmission apparatus 400 so as to allow messages and the authentication key to be exchanged with coordinated timing. As a result, a message that has been tampered with at an illegal message reception apparatus or another electronic apparatus can be detected since its timing is bound to be uncoordinated with the established time-point synchronization.

The present invention also provides a program and a storage medium containing the program, which enable a computer to function as the message reception apparatus 420 described above.

(Message Transmission Method and Message Reception Method)

Next, the message transmission method for transmitting messages to a plurality of message reception apparatuses 420 from the message transmission apparatus 400 through the multi-hop communication achieved in the second embodiment and the message reception method for receiving the messages through the multi-hop communication are explained.

Figure 13:
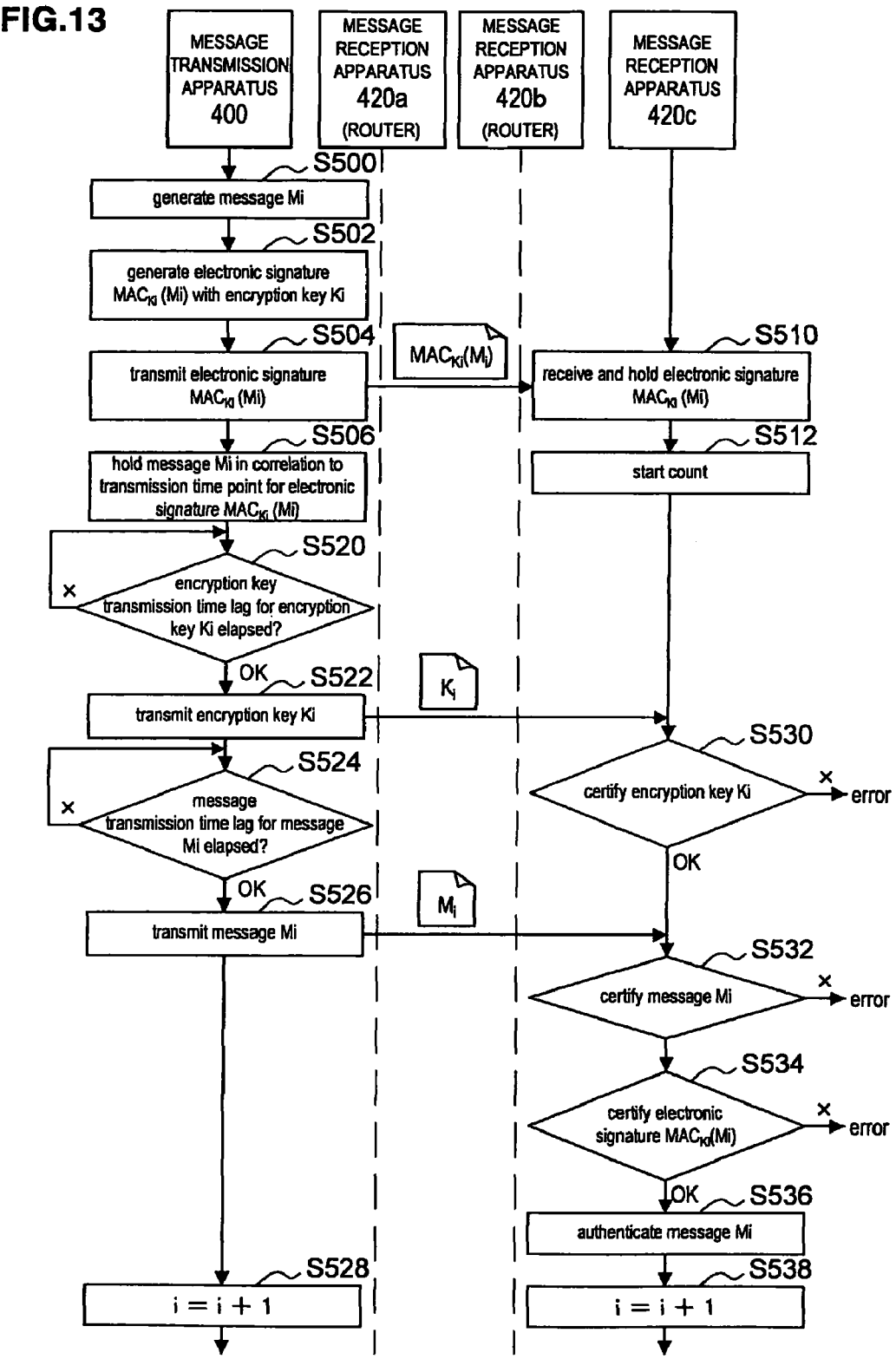
FIG. 13 presents a flowchart of the processing executed by adopting the message transmission/reception methods.

FIG. 13 presents a flowchart of the processing executed by adopting the message transmission method and the message reception method. The message transmission apparatus 400 first generates a message $M_i$ (S500) and then generates an electronic signature $MAC_{Ki}$ ($M_i$) (S502) for the message $M_i$ by using an authentication key $K_i$ while the authentication key $K_i$, still unknown to the individual message reception apparatuses 420 (the network) is valid. "i" is an integer.

The message transmission apparatus 400 then transmits the electronic signature $MAC_{Ki}$ ($M_i$) having been generated to the message reception apparatus 420c (S504) and holds the message $M_i$ in the message transmission apparatus 400 in correlation to the electronic signature $MAC_{Ki}$ ($M_i$) (S506). The authentication key $K_i$ is an authentication key having been extracted in sequence from the authentication key chain having been generated by using the one-way function as explained earlier. This means that while ki can be generated based upon $K_{i+1}$, $K_{i+1}$ cannot be deduced from $K_i$.

The message reception apparatus 420c then receives the electronic signature $MAC_{Ki}$ ($M_i$) and holds the electronic signature MACK ($M_i$) thus received until the authentication key $K_i$ is transmitted (S510). At this time, the message reception apparatus 420c also holds the time point at which the electronic signature $MAC_{Ki}$ ($M_i$) is received and starts a time count (S512) based upon which the message transmission time lag elapsing following the reception of the electronic signature $MAC_{Ki}$ ($M_i$) is to be judged. For purposes of message authentication, the message reception apparatus 420c also ascertains the place of the received electronic signature $MACK_i$ ($M_i$) in the reception order.

Based upon the time-point synchronization having been established, the message transmission apparatus 400 updates the authentication key by extracting from the authentication key chain the authentication key $K_{i+1}$, to be used to encrypt the next message $M_{i+1}$ and provides the new authentication key $K_{i+1}$, to the signature generation unit 204. Namely, at this point in time, the valid period for the authentication key $K_i$ expires and the new authentication key $K_{i+1}$, becomes legal. Then, the time count for the preset transmission time lag with which the authentication key $K_i$ is to be transmitted following the authentication key update is started (S520). As the length of time matching the transmission time lag elapses, the authentication key $K_i$ is directed to be disclosed to the individual message reception apparatuses (the network) and the authentication key $K_i$ is thus transmitted to the message reception apparatus 420c (S522).

In addition to the authentication key transmission time lag, the transmission time lag with which the message $M_i$ is to be transmitted following the transmission of the corresponding electronic signature $MAC_{Ki}$ ($M_i$) is also counted (S524) at the message transmission apparatus 400. Once the length of time matching the transmission time lag elapses, the message $M_i$ is transmitted to the individual message transmission apparatuses including the message transmission apparatus 420c (S526). The message $M_i$ may be transmitted before or after the authentication key $K_i$ is transmitted. Once the transmission is completed, the message transmission apparatus starts to prepare for the transmission of the next message $M_{i+1}$ (S528).

The message reception apparatus 420c certifies the received authentication key $K_i$ (S530). In the first phase of authentication key certification, the message reception apparatus 420c checks the timing with which the authentication key has been published so as to ascertain whether or not it has been disclosed with the predetermined transmission time lag following the authentication key update through which the authentication key $K_i$ was updated to the authentication key $K_{i+1}$. In the second phase, the authentication key is certified by comparing the results obtained by applying the one-way function f in an arithmetic operation executed on the authentication key $K_i$ with the previous authentication key $K_{i-1}$ held at the message reception apparatus 420c. If the two values match, the authentication key $K_i$ is held to be compared with the authentication key $K_{i+1}$, corresponding to the next message $M_{i+1}$, and the operation shifts into the subsequent step. If they do not match, on the other hand, an authentication error occurs and error processing is executed.

If the authentication key $K_i$ having been received is judged to be legal, the transmission time lag elapsing between the reception of the electronic signature $MAC_{Ki}(M_i)$ having been received from the message transmission apparatus 400 in the step for receiving and holding the signature (S510) and the arrival of the message $M_i$ is verified (S532) in a manner similar to that described earlier. Then, the electronic signature $MAC_{Ki}(M_i)$ is certified (S534). The arithmetic operation for certifying the electronic signature $MAC_{Ki}(M_i)$ is executed by generating an electronic signature through a procedure identical to the procedure through which the electronic signature was generated at the message transmission apparatus 400 and judging whether or not the newly generated electronic signature matches the electronic signature $MAC_{Ki}(M_i)$ held at the message reception apparatus 420c.

Through this process, any alteration of the message $M_i$ or of the electronic signature $MAC_{Ki}(M_i)$ having been transmitted from the message transmission apparatus 400 can be detected. The message $M_i$ having passed these certification steps (S532 and S534) is authenticated (S536), and the message reception apparatus 420c then starts processing the message $M_i$ and also prepares for the reception of the next message $M_{i+1}$ (S538).

While the explanation above is simplified by focusing on the message transmission from the message transmission apparatus 400 to the message reception apparatus 420c, as in the explanation having been given in reference to FIG. 2, it is obvious that similar processing is also executed between the message transmission apparatus 400 and the message reception apparatus 420a and between the message transmission apparatus 400 and the message reception apparatus 420b. In addition, while the data transfer from the message transmission apparatus 400 to the message reception apparatus 420c is indicated with straight lines in FIG. 3, data may be transferred to the message reception apparatus 420c via the message reception apparatuses 420a and 420b acting as router message reception apparatuses as well.

In addition, while the authentication key is updated in correspondence to each message in the explanation provided above, a single authentication key is transmitted in correspondence to all the messages for which electronic signatures are generated while the authentication key $K_i$ is legal.

(Third Embodiment: Message Transmission Apparatus and Message Reception Apparatus)

Figure 14:
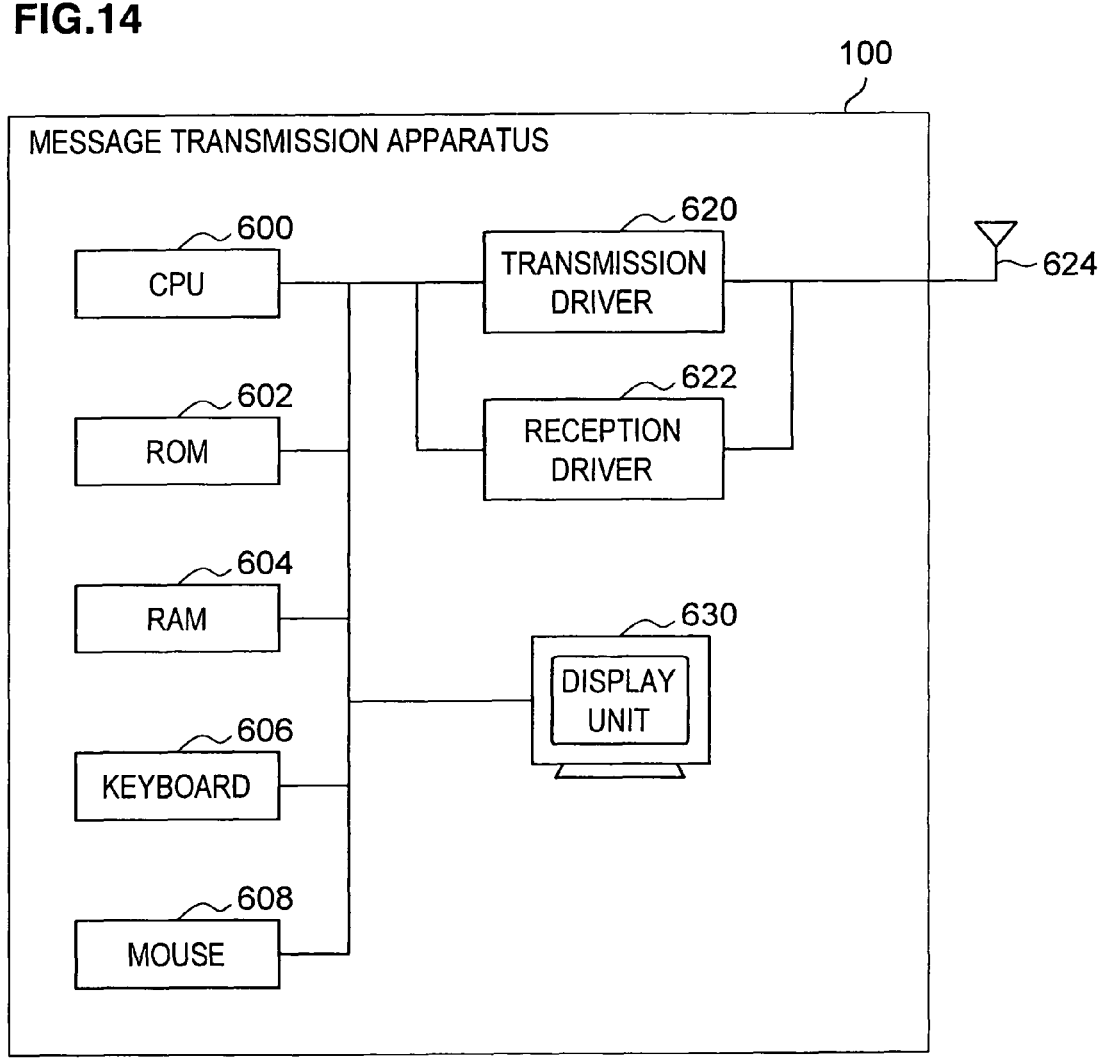
FIG. 14 is a block diagram showing a specific structure that may be adopted in the message transmission apparatus.

FIG. 14 is a block diagram showing a specific structure that may be adopted in the message transmission apparatus 100 (or 400) achieved in the first or second embodiment. The message transmission apparatus 100 comprises a CPU 600, a ROM 602, a RAM 604, a keyboard 606, a mouse 608, a transmission driver 620, a reception driver 622, an antenna 624 and a display unit 630.

The CPU 600 controls the entire message transmission apparatus 100 and executes the message transmission achieved in the embodiment.

A program that enables the message transmission apparatus 100 to fulfill the message transmission apparatus functions described earlier, may be stored in the ROM 602. The RAM 604, which plays an auxiliary role in the execution of the program, may also be utilized as the message holding unit in conjunction with a hard disk drive.

The keyboard 606 and the mouse 608 constitute a user interface, and their main function in the embodiment is to support the generation of messages to be transmitted to the message reception apparatus 120. In addition, an existing message may be downloaded from a communication network such as the Internet and the downloaded message may then be transmitted to the message reception apparatus 120 via the user interface.

The transmission driver 620 modifies electronic data such as electronic signatures, messages and authentication keys provided by the CPU 600 into a format that enables serial transmission and transmits the formatted electronic data to the antenna 624.

The reception driver 622 converts data originating from the message reception apparatus 120 and received at the antenna 624 to a format that enables processing thereof at the CPU 600 and then transfers the formatted data to the CPU 600.

The display unit 630 is utilized when verifying processing details during message generation, program maintenance and the like.

Figure 15:
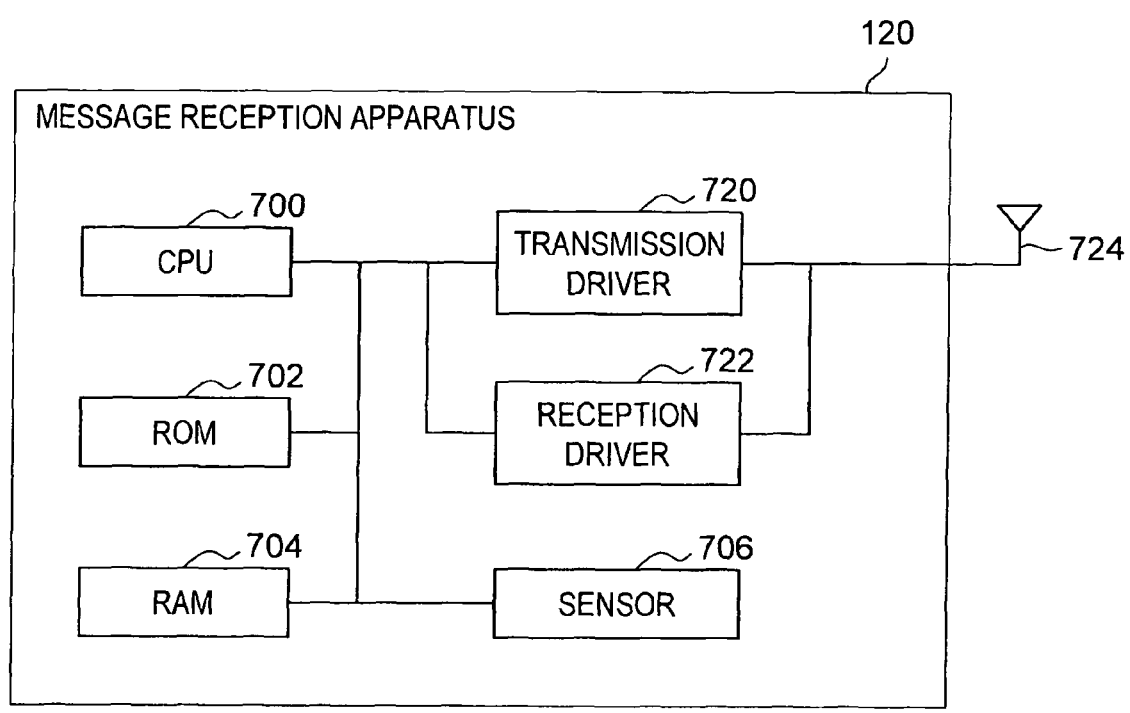
FIG. 15 is a block diagram showing a specific structure that may be adopted in the message reception apparatus.

FIG. 15 is a block diagram showing a specific structure that may be adopted in the message reception apparatus 120 (or 420) in the first or second embodiment. The message reception apparatus 120 comprises a CPU 700, a ROM 702, a RAM 704, a sensor 706, a transmission driver 720, a reception driver 722 and an antenna 724.

Since the functions of the CPU 700, the ROM 702, the RAM 704, the transmission driver 720, the reception driver 722 and the antenna 724 are substantially identical to those of the ROM 602, the RAM 604, the transmission driver 620, the reception driver 622 and the antenna 624 in the message transmission apparatus 100 described above, a repeated explanation thereof is omitted.

The sensor 706 is constituted with various measuring devices capable of measuring various parameters such as the light quantity indicating brightness or the like, the sound volume, the temperature, the air pressure and the humidity. Accordingly, the message reception apparatus 120 in the embodiment may be utilized as a message reception apparatus with sensor functions, e.g., as a sensor node, and by disposing a plurality of sensor nodes in correspondence to a single message transmission apparatus, various types of information with regard to the locations at which the individual sensor nodes are disposed can be collected.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

While a key extracted from an authentication key chain is used as the authentication key in the embodiments described above, the present invention is not limited to this example, and the signature generation unit may use information derived from a specific authentication key in the authentication key chain as the authentication key. In such a case, the derived information should be shared between the message transmission apparatus and the message reception apparatuses.

In addition, while intermediary message reception apparatuses (router message reception apparatuses) that relay messages from the message transmission apparatus to other message reception apparatuses in multi-hop communication are not explained in detail in reference to the embodiments, the message reception apparatus described above may further include a relay device to direct messages to other message reception apparatuses. In such a case, data originating from a message reception apparatus can be relayed to the message transmission apparatus.

While the embodiments are described by assuming that a multi-hop tree structure such as that shown in FIG. 1 is adopted therein, the present invention is not limited to this example, and it may be adopted in a one-hop star-type network structure such as that disclosed in Japanese Patent Application No. 2004-324094 filed by the applicant of the present invention.

It is to be noted that the individual steps of the message transmission method or the message reception method disclosed in the specification do not need to be executed in time series in conformance to the sequence described in the flowcharts and the message transmission and the message reception may be achieved through processing executed concurrently or individually (e.g., parallel processing or object-based processing.

What is claimed is:

1. A message authentication system, comprising:
   a message transmission apparatus operated by a microprocessor; and
   a plurality of message reception apparatuses in which a message is transmitted from the message transmission apparatus to each of the message reception apparatuses through wireless communication connecting the message transmission apparatus with each message reception apparatus via an intermediary message reception apparatus present between them and the message is authenticated at each message reception apparatus, each message reception apparatus being operated by a microprocessor;
   the message transmission apparatus comprising
      a signature generation unit having means for generating a first electronic signature for a given message by encrypting the message using an authentication key as a common key shared with each message reception apparatus,
      a message holding unit having means for holding the message in correlation to the authentication key and the first electronic signature,
      a message transmission unit having means for transmitting the first electronic signature to each message reception apparatus and transmitting the message and the authentication key correlated with the message after allowing a predetermined time lag, and
      a time-point synchronization control unit having means for first achieving time-point synchronization with each message reception apparatus, then managing a message transmission time lag to elapse after transmitting the first electronic signature and an authentication key transmission time lag to elapse after the authentication key is updated, and engaging the message transmission unit to transmit the message and the authentication key correlated to the message with the transmission time lags; and
   each message reception apparatus comprising
      a message reception unit having means for receiving the first electronic signature transmitted from the message transmission apparatus first and the message and the authentication key transmitted from the transmission apparatus second, after the predetermined time lag,
      a signature holding unit having means for holding the received first electronic signature, and
      a message authentication unit having means for generating a second electronic signature by encrypting the message using the authentication key, comparing the second electronic signature with the first electronic signature held at the signature holding unit, authenticating the message if the second electronic signature matches the first electronic signature and detecting an alteration of the message if the second electronic signature does not match the first electronic signature, wherein
      the signature generation unit further includes means for generating a predetermined number of electronic signatures for the predetermined number of messages by using a single authentication key,
      the message transmission unit further includes means for transmitting the predetermined number of electronic signatures to each message reception apparatus and, after transmitting the electronic signatures, transmitting the predetermined number of messages and the single authentication key to each message reception apparatus, and
      each message reception unit further includes means for receiving the predetermined number of electronic signatures transmitted from the message transmission apparatus and, after receiving the electronic signatures, receiving the predetermined number of messages and the single authentication key transmitted from the message transmission apparatus.

2. A message authentication system according to claim 1, wherein the message transmission apparatus further comprises:
   an arrival verification unit having means for receiving from each message reception apparatus reception verification information indicating that the first electronic signature has been successfully received at each message reception apparatus, judging that the first electronic signature correlated to the message has arrived at each message reception apparatus, and allowing the message transmission unit to transmit the message and the authentication key correlated to the message to each message reception apparatus, wherein
      the arrival verification unit further includes means for receiving from each message reception apparatus reception verification information indicating that each of the predetermined number of electronic signatures has been successfully received at each message reception apparatus, judging that all of the predetermined number of electronic signatures correlated to the predetermined number of messages have arrived at each message reception apparatus, and allowing the message transmission unit to transmit the predetermined number of messages and the single authentication key to each message reception apparatus.

3. A message authentication system according to claim 2, wherein the message transmission apparatus further comprises an authentication key generation unit having means for updating the authentication key at the signature generation unit by sequentially extracting a specific authentication key from an authentication key chain constituted with a plurality of authentication keys after each time interval during which a further predetermined number of electronic signatures have been generated at the signature generation unit.

4. A message authentication system according to claim 3, wherein the authentication keys constituting the authentication key chain are sequentially generated by the authentication key generation unit by applying a one-way function to a preset initial authentication key, and the authentication key generation unit further includes means for extracting the authentication keys in the reverse order from the order in which the authentication keys have been generated.

5. A message authentication system according to claim 2, wherein the message transmission apparatus further comprises an authentication key generation unit having means for updating the authentication key at the signature generation unit by sequentially extracting a specific authentication key from an authentication key chain constituted with a plurality of authentication keys after a predetermined length of time interval.

6. A message authentication system according to claim 5, wherein the signature generation unit further includes means for generating all electronic signatures for messages generated during the predetermined length of time by using a further single authentication key, and the message transmission unit further includes means for transmitting the messages generated during the predetermined length of time together with the shared authentication key for the messages generated during the predetermined length of time.

7. A message authentication system according to claim 5, wherein the authentication keys constituting the authentication key chain are sequentially generated by applying a one-way function to a preset initial authentication key, and the authentication key generation unit further includes means for extracting the authentication keys in the reverse order from the order in which the authentication keys have been generated.

8. A message authentication system according to claim 1, wherein each message reception apparatus further comprises:

a reception verification transmission unit having means for, upon receiving the first electronic signature from the message transmission apparatus, transmitting to the message transmission apparatus reception verification information indicating that the first electronic signature has been successfully received, wherein the message authentication unit further includes means for generating further electronic signatures by encrypting the received predetermined number of messages using the received single authentication key, comparing the further electronic signatures with the received predetermined number of electronic signatures, authenticating the received messages if the further electronic signatures match the received electronic signatures, and detecting an alteration of the received messages if the further electronic signatures do not match the received electronic signatures, and the reception verification transmission unit further includes means for, upon receiving each of the predetermined number of electronic signatures from the message transmission apparatus, transmitting to the message transmission apparatus reception verification information indicating that said each of the predetermined number of electronic signatures has been successfully received.

9. A message authentication system according to claim 8, wherein each message reception apparatus further comprises an authentication key certifying unit having means for certifying that the authentication key is updated in correspondence to each set of a further predetermined number of electronic signatures or messages and withholding certification that the authentication key has been transmitted from the message transmission apparatus if the authentication key has not been updated in correspondence to each set of the further predetermined number of electronic signatures or messages.

10. A message authentication system according to claim 9, wherein the authentication key certifying unit further includes means for holding the authentication key, and the authentication key certifying unit further includes means for, in the event of an authentication key update, applying a one-way function to the updated authentication key a given number of times, comparing the results of one-way function application with a value indicated by the pre-update authentication key having been held, and if the one-way function application results and the value do not match, withholding certification that the authentication key has been transmitted from the message transmission apparatus.

11. A message authentication system according to claim 8, wherein each message reception apparatus further comprises an authentication key certifying unit having means for checking the authentication key to ensure that the authentication key has been updated after a predetermined time interval, and withholding certification that the authentication key has been transmitted from the message transmission apparatus if the authentication key update does not match up with the predetermined time interval.

12. A message authentication system according to claim 11, wherein the authentication key certifying unit further includes means for holding the authentication key, and the authentication key certifying unit further includes means for, in the event of an authentication key update, applying a one-way function to the updated authentication key a given number of times, comparing the results of one-way function application with a value indicated by the pre-update authentication key having been held, and if the one-way function application results and the value do not match, withholding certification that the authentication key has been transmitted from the message transmission apparatus.

* * * * *